(12) United States Patent
Yusa et al.

(10) Patent No.: US 11,820,063 B2
(45) Date of Patent: Nov. 21, 2023

(54) MANUFACTURING METHOD AND MANUFACTURING DEVICE FOR FOAM MOLDED ARTICLE

(71) Applicant: MAXELL, LTD., Kyoto (JP)

(72) Inventors: Atsushi Yusa, Nagaokakyo (JP); Satoshi Yamamoto, Suita (JP); Hideto Goto, Muko (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/953,914

(22) Filed: Sep. 27, 2022

(65) Prior Publication Data

US 2023/0021266 A1 Jan. 19, 2023

Related U.S. Application Data

(60) Division of application No. 16/564,640, filed on Sep. 9, 2019, now Pat. No. 11,478,969, which is a
(Continued)

(30) Foreign Application Priority Data

Mar. 10, 2017 (JP) .................................. 2017-045574

(51) Int. Cl.
*B29C 48/53* (2019.01)
*B29C 48/395* (2019.01)
(Continued)

(52) U.S. Cl.
CPC .............. *B29C 48/53* (2019.02); *B29C 44/02* (2013.01); *B29C 45/60* (2013.01); *B29C 45/62* (2013.01);
(Continued)

(58) Field of Classification Search
CPC ....... B29C 48/53; B29C 48/397; B29C 44/02; B29C 45/60; B29C 45/62; B29K 2105/04
(Continued)

(56) References Cited

U.S. PATENT DOCUMENTS 5,089,193 A 2/1992 Behrens et al.
5,997,781 A 12/1999 Nishikawa et al.
(Continued)

FOREIGN PATENT DOCUMENTS

CN 108472845 A 8/2018
JP 48-100479 A 12/1973
(Continued)

OTHER PUBLICATIONS

Chinese Office Action issued in corresponding Chinese Patent Application No. 20188004113.5, dated Aug. 7, 2020, with English translation.
(Continued)

*Primary Examiner* — Matthew J Daniels
*Assistant Examiner* — Gregory C. Grosso
(74) *Attorney, Agent, or Firm* — McDermott Will & Emery LLP

(57) ABSTRACT

A method for producing a foam-molded product uses a producing apparatus including a plasticizing cylinder. The plasticizing cylinder has a plasticization zone, a starvation zone, and an introducing port which is formed in the plasticizing cylinder and via which a physical foaming agent is introduced into the starvation zone. The method includes: plasticizing and melting a thermoplastic resin into a molten resin in the plasticization zone; introducing a pressurized fluid containing the physical foaming agent having a fixed pressure into the starvation zone; allowing the molten resin to be in the starved state in the starvation zone; bringing the molten resin in the starved state into contact with the
(Continued)

pressurized fluid having the fixed pressure in the starvation zone; and molding the molten resin into the foam-molded product. At least one pressure boosting part is provided in the starvation zone.

9 Claims, 3 Drawing Sheets

Related U.S. Application Data continuation of application No. PCT/JP2018/008070, filed on Mar. 2, 2018.

(51) Int. Cl.
  *B29C 44/02* (2006.01)
  *B29C 45/60* (2006.01)
  *B29C 45/62* (2006.01)
  *B29K 105/04* (2006.01)

(52) U.S. Cl.
  CPC ........ *B29C 48/397* (2019.02); *B29K 2105/04* (2013.01)

(58) Field of Classification Search
  USPC .......................................................... 264/51
  See application file for complete search history.

(56) References Cited

U.S. PATENT DOCUMENTS

| | | |
|---|---|---|
| 2013/0285273 A1 | 10/2013 | Yusa et al. |
| 2017/0225372 A1* | 8/2017 | Yamamoto ............... C08J 9/122 |
| 2018/0117823 A1 | 5/2018 | Yusa et al. |
| 2018/0339439 A1 | 11/2018 | Yusa et al. |

FOREIGN PATENT DOCUMENTS

| | | |
|---|---|---|
| JP | 52-063265 A | 5/1977 |
| JP | 52-125577 A | 10/1977 |
| JP | 55-134226 U | 9/1980 |
| JP | 58-36423 A | 3/1983 |
| JP | 2625576 B2 | 7/1997 |
| JP | 2001-341152 A | 12/2001 |
| JP | 2003-127179 A | 5/2003 |
| JP | 2004-237522 A | 8/2004 |
| JP | 3788750 B2 | 6/2006 |
| JP | 4144916 B2 | 9/2008 |
| JP | 2013-107402 A | 6/2013 |
| JP | 2016-087887 A | 5/2016 |
| WO | 92/17533 A1 | 10/1992 |
| WO | 2017/007032 A1 | 1/2017 |
| WO | 2017/159166 A1 | 9/2017 |

OTHER PUBLICATIONS

International Search Report issued in corresponding International Patent Application No. PCT/JP2018/008070, dated Jun. 5, 2018, with English translation.

Japanese Notice of Reasons for Refusal issued in corresponding Japanese Patent Application No. 2017-045574, dated Sep. 15, 2020, with English translation.

Notice of Allowance issued in corresponding U.S. Appl. No. 16/564,640, dated Jun. 15, 2022.

Office Action issued in corresponding U.S. Appl. No. 16/564,640, dated Mar. 1, 2022.

Translation of the Written Opinion of the International Searching Authority issued in International Patent Application No. PCT/JP2018/008070, dated Jun. 5, 2018.

Korean Notification of Reason for Refusal issued in Korean Patent Application No. 10-2019-7026501, dated Aug. 31, 2020, with English translation.

Second Chinese Office Action issued in corresponding Chinese Patent Application No. 20188004113.5, dated Mar. 31, 2021, with English translation.

* cited by examiner

MANUFACTURING METHOD AND MANUFACTURING DEVICE FOR FOAM MOLDED ARTICLE

CROSS REFERENCE TO RERATED APPLICATION

This application is a Divisional of U.S. patent application Ser. No. 16/564,640, filed Sep. 9, 2019, which is a Continuation Application of International Application No. PCT/JP2018/008070 which was filed on Mar. 2, 2018 claiming the conventional priority of Japanese patent Application No. 2017-045574 filed on Mar. 10, 2017.

BACKGROUND OF THE INVENTION

Field of the Invention

The present invention relates to a method and an apparatus for producing a foam-molded product.

Description of the Related Art

In recent years, an injection foam molding method, which uses nitrogen or carbon dioxide in the supercritical state as a physical foaming agent, is researched and practically used (Patent Literature 1: Japanese Patent No. 2625576 corresponding to PCT International Publication WO92/17533; Patent Literature 2: Japanese Patent No. 3788750; and Patent Literature 3: Japanese Patent No. 4144916). According to Patent Literatures 1 to 3, the injection foam molding method, which uses the physical foaming agent, is performed as follows. At first, the physical foaming agent is introduced into a hermetically closed plasticizing cylinder, and the physical foaming agent is brought into contact with and dispersed in a plasticized and melt (molten) resin. The molten resin, in which the physical foaming agent is dispersed, is weighed or metered while retaining (maintaining) a high pressure in the plasticizing cylinder to such an extent that the physical foaming agent is in the supercritical state, and then the molten resin is injected and charged into a mold. The supercritical fluid, which has been compatibly dissolved in the molten resin, is subjected to the sudden pressure reduction during the injection charging, and the supercritical fluid is gasified. The molten resin is solidified, and thus foams or bubbles (foam cells) are formed at the inside of a molded product. In the injection foam molding method as described above, the physical foaming agent is weighed at a pressure which is slightly higher than the internal pressure of the resin. After the weighing, the physical foaming agent is introduced into the plasticizing cylinder. Therefore, the amount of dissolution of the physical foaming agent in the molten resin is determined by the amount of introduction of the physical foaming agent (introduction amount control).

Further, Patent Literature 4 (Japanese Patent Application Laid-open No. 2013-107402 corresponding to U.S. Patent Application Publication 2013/285273) discloses an injection foam molding method based on the use of a physical foaming agent, wherein a part of the physical foaming agent, which is contained in a molten resin, is separated during the molding; the separated part of the physical foaming agent is discharged to the outside of a plasticizing cylinder (kneading apparatus) in this method. Patent Literature 4 discloses the kneading apparatus which is formed with a vent for discharging the physical foaming agent and which has a mechanism for maintaining a fixed pressure (constant pressure) in an area (pressure reduction zone) having the vent formed therein. According to this method, the amount of dissolution of the physical foaming agent in the molten resin is determined by the pressure of a back pressure valve in the pressure reduction zone (pressure control). Therefore, it is unnecessary to correctly control the amount of pouring of the physical foaming agent into the plasticizing cylinder, unlike the technique as disclosed in Patent Literatures 1 to 3 described above.

Patent Literatures 5 and 6 (Patent Literature 5: Japanese Patent Application Laid-open No. 2001-341152; and Patent Literature 6: Japanese Patent Application Laid-open No. 2004-237522) also disclose an injection foam molding method based on the use of a physical foaming agent; the physical foaming agent is introduced into a plasticizing cylinder in accordance with the pressure control in this method. In Patent Literatures 5 and 6, a starvation zone, which is unfulfilled with the molten resin, is provided in the plasticizing cylinder, and the physical foaming agent is introduced into the starvation zone.

A producing apparatus, which is disclosed in Patent Literatures 5 and 6, has such a structure that the inner diameter of an introducing port for introducing the physical foaming agent is small, and the introducing port is opened intermittently by a check valve, etc., in the same manner as the conventional and general producing apparatus. The reason for allowing the conventional producing apparatus, which uses the physical foaming agent, to have the above-described structure is as follows. Firstly, in a case that the physical foaming agent is introduced into the plasticizing cylinder, the temperature of the physical foaming agent is suddenly raised on account of the contact with the molten resin having a high temperature, which in turn leads to such a harmful influence that the amount of introduction of the physical foaming agent becomes unstable. On this account, in the conventional producing apparatus, an attempt is made to make the flow passage for the physical foaming agent to be narrow and thin in order to control the flow rate of the physical foaming agent, thereby stabilizing the amount of introduction. Secondly, if the molten resin flows backwardly in the flow passage which is thin as described above, it is feared that the flow passage might be immediately clogged up and the flow passage might malfunction. On this account, the introducing port for introducing the physical foaming agent is not normally open (is not open all the time). Rather, such a structure is adopted that the check valve, etc., is provided to intermittently open the introducing port.

In the injection foam molding method based on the use of the physical foaming agent as described in Patent Literatures 1 to 3, if the concentration of the physical foaming agent is high in the molten resin, it is feared that the molten resin and the physical foaming agent might undergo the phase separation. On this account, it has been necessary that the concentration of the physical foaming agent should be lowered to about $\frac{1}{5}$ to $\frac{1}{10}$ of the saturated solubility. Then, in order that a large number of foaming nuclei are formed during the injection charging into the mold while allowing the concentration of the physical foaming agent in the molten resin to be at the low ratio with respect to the saturated solubility, it has been necessary that the physical foaming agent to be introduced into the plasticizing cylinder should be set to have a high pressure and the amount of introduction should be correctly weighed. This results in the main cause or primary factor to complicate the supplying mechanism for supplying the physical foaming agent and increase the initial cost of the apparatus.

On the other hand, in the injection foam molding method based on the use of the physical foaming agent as described in Patent Literature 4, the kneading apparatus, which is adopted as described above, makes it possible to raise the concentration of the physical foaming agent in the molten resin to a concentration approximate to the saturated solubility (saturated concentration) after discharging the part of the physical foaming agent, wherein it is possible to form a large number of foaming nuclei by using the physical foaming agent having a relatively low pressure. However, the injection foam molding method described in Patent Literature 4 involves a seal mechanism which shuts off the pressure reduction zone from other zones by reversely rotating a screw in order to maintain a fixed pressure (constant pressure) in the pressure reduction zone. On this account, problems arise, for example, such that the screw is lengthened, and the plasticizing weighing time is prolonged because the screw is reversely rotated.

In the injection foam molding method as described in Patent Literatures 5 and 6, the physical foaming agent is introduced into the plasticizing cylinder in accordance with the pressure control. Therefore, it is unnecessary to correctly weigh the amount of introduction of the physical foaming agent. Further, it is not necessarily indispensable to provide the seal mechanism as disclosed in Patent Literature 4. However, according to the investigation performed by the present inventors, in a case that the physical foaming agent is intermittently introduced into the starvation zone in the plasticizing cylinder as disclosed in Patent Literatures 5 and 6, the pressure varies or fluctuates in the starvation zone. As a result, it is feared that the amount of dissolution (amount of permeation) of the physical foaming agent with respect to the molten resin cannot be controlled accurately.

It is speculated that the main cause of the above-described situation is the insufficient amount of introduction of the physical foaming agent, because the physical foaming agent is intermittently introduced into the plasticizing cylinder. However, as described above, there are the problem of the difference in temperature between the introduced physical foaming agent and the molten resin and the problem of the backward flow of the molten resin. Therefore, it has been difficult to increase the amount of introduction of the physical foaming agent and to attempt the stabilization by using the apparatus having the structure as disclosed in Patent Literatures 5 and 6.

The present teaching has been made to solve the problems described above. The present teaching provides a method for producing a foam-molded product (foamed molded product) which makes it possible to omit or simplify the complicated control device for the physical foaming agent and which makes it possible, with a simple mechanism, to stabilize the amount of dissolution (amount of permeation) of the physical foaming agent with respect to the molten resin.

SUMMARY OF THE INVENTION

According to a first aspect of the present teaching, there is provided a method for producing a foam-molded product by using a producing apparatus including a plasticizing cylinder provided with a plasticizing screw which is rotatable inside the plasticizing cylinder, the plasticizing cylinder having: a plasticization zone in which a thermoplastic resin is plasticized and melt into a molten resin, a starvation zone in which the molten resin is allowed to be in a starved state, and an introducing port which is formed in the plasticizing cylinder and via which a physical foaming agent is introduced into the starvation zone, the method including:

plasticizing and melting the thermoplastic resin into the molten resin in the plasticization zone;

introducing a pressurized fluid containing the physical foaming agent having a fixed pressure into the starvation zone;

allowing the molten resin to be in the starved state in the starvation zone;

bringing the molten resin in the starved state into contact with the pressurized fluid having the fixed pressure in the starvation zone; and molding the molten resin, having been brought into contact with the pressurized fluid having the fixed pressure, into the foam-molded product, wherein at least one pressure boosting part is provided in the starvation zone of the plasticizing cylinder.

In the first aspect, the pressure boosting part may be formed of a part of the plasticizing screw; and in the starvation zone, diameter of a shaft of the plasticizing screw may be greater in the pressure boosting part than in a different part from the pressure boosting part. In the starvation zone, the diameter of the shaft of the plasticizing screw in the different part from the pressure boosting part may be constant.

The plasticizing cylinder may further have a compression zone which is arranged on an upstream side of the starvation zone and in which the molten resin is compressed so as to increase pressure of the molten resin; and a maximum value of the diameter of the shaft of the plasticizing screw in the pressure boosting part may be smaller than that of the plasticizing screw in the compression zone. The plasticizing cylinder may satisfy the following expression (1):

$$0.5DS_2 < DS_1 < 0.95DS_2 \qquad (1)$$

in the expression (1), $DS_1$: the maximum value of the diameter of the shaft of the plasticizing screw in the pressure boosting part, and $DS_2$: the maximum value of the diameter of the shaft of the plasticizing screw in the compression zone.

The plasticizing cylinder may satisfy the following expression (2):

$$0.5DC \leq L \leq 2DC \qquad (2)$$

in the expression (2),

L: length of the pressure boosting part in an extending direction of the plasticizing screw, and DC: inner diameter of the plasticizing cylinder.

The producing apparatus may further include an introducing speed adjusting container connected to the introducing port of the plasticizing cylinder. A maximum value of inner diameter of the introducing speed adjusting container may be greater than inner diameter of the introducing port; the method may further include supplying the pressurized fluid having the fixed pressure into the introducing speed adjusting container; and the pressurized fluid having the fixed pressure may be introduced from the introducing speed adjusting container into the starvation zone. The fixed pressure may be in a range of 1 MPa to 20 MPa.

In a case of bringing the molten resin in the starved state into contact with the pressurized fluid having the fixed pressure in the starvation zone, pressure of the molten resin in the pressure boosting part may be higher than the fixed pressure. An absolute value of difference between the pressure of the molten resin in the pressure boosting part and the fixed pressure may be not more than 4 MPa. The fixed pressure may be less than 6 MPa.

In a case of bringing the molten resin in the starved state into contact with the pressurized fluid having the fixed pressure in the starvation zone, the starvation zone may be maintained at the fixed pressure. The fixed pressure may be not less than 6 MPa.

According to a second aspect of the present teaching, there is provided a producing apparatus for producing a foam-molded product, including:
  a plasticizing cylinder provided with a plasticizing screw which is rotatable inside the plasticizing cylinder, the plasticizing cylinder having; a plasticization zone in which a thermoplastic resin is plasticized and melt into a molten resin, a starvation zone in which the molten resin is allowed to be in a starved state, and an introducing port which is formed in the plasticizing cylinder and via which a physical foaming agent is introduced into the starvation zone; and
  a physical foaming agent supplying mechanism configured to supply the physical foaming agent having a fixed pressure into the plasticizing cylinder,
  wherein at least one pressure boosting part is provided inside the starvation zone of the plasticizing cylinder.

DESCRIPTION OF THE PREFERRED EMBODIMENT

An explanation will be made about a method (producing method) for producing a foam-molded product (foamed molded product or foam-molded body) of an embodiment of the present teaching, with reference to the flow chart depicted in FIG. 1.

In the method for producing the foam-molded product of the embodiment, it is unnecessary to control, for example, the amount of introduction and the time of introduction of the physical foaming agent into the molten resin. Therefore, the method of the embodiment makes it possible to omit or simplify the complicated control device, and to reduce the apparatus cost. Further, the method for producing the foam-molded product of the embodiment makes it possible to stabilize the amount of dissolution (amount of permeation) of the physical foaming agent with respect to the molten resin by the simple mechanism. Furthermore, the method for producing the foam-molded product of the embodiment promotes the permeation of the physical foaming agent with respect to the molten resin, and suppress the separation of the physical foaming agent from the molten resin.

[Apparatus for Producing Foam-Molded Product]

Figure 2:
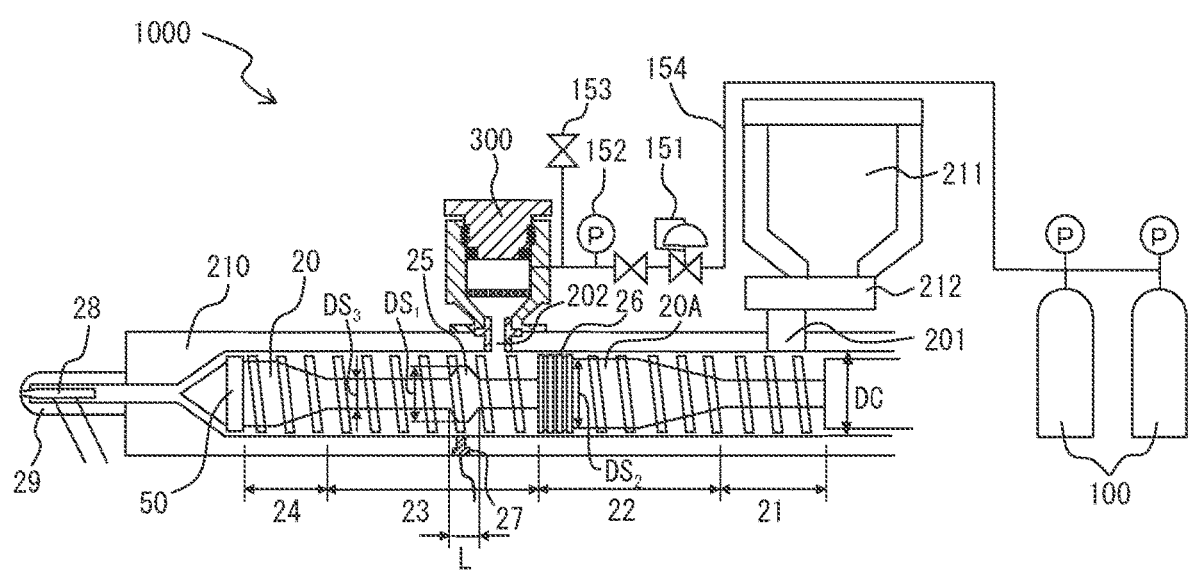
FIG. 2 is a view schematically depicting a producing apparatus for producing the foam-molded product used in the embodiment.

Firstly, an explanation will be made about an apparatus (a producing apparatus) for producing a foam-molded product used in the embodiment. In the embodiment, the foam-molded product is produced by using a producing apparatus (injection molding apparatus) 1000 depicted in FIG. 2. The producing apparatus 1000 mainly includes a plasticizing cylinder 210 which includes a screw (plasticizing screw) 20 provided in the inside of the plasticizing cylinder 210, a bomb 100 which serves as a physical foaming agent supplying mechanism for supplying a physical foaming agent to the plasticizing cylinder 210, a clamping unit (not depicted in the drawings) which is provided with a mold, and a control device (controller) (not depicted in the drawings) which is configured to control the operations of the plasticizing cylinder 210 and the clamping unit. A molten resin, which is plasticized and melt in the plasticizing cylinder 210, flows from the right to the left as viewed in FIG. 2. Therefore, at the inside of the plasticizing cylinder 210 of the embodiment, the right as viewed in FIG. 2 is defined as "upstream" or "backward", and the left is defined as "downstream" or "frontward".

The plasticizing cylinder has: a plasticization zone 21 in which a thermoplastic resin is plasticized and melt into the molten resin, and a starvation zone 23 which located on the downstream side of the plasticization zone 21 and in which the molten resin is allowed to be in the starved state. The term "starved state" is a state in which the interior of the starvation zone 23 is not fulfilled with the molten resin and the interior of the starvation zone 23 is unfulfilled. Therefore, the space other than the part or portion occupied by the molten resin exists in the starvation zone 23. Further, an introducing port 202, which is provided to introduce the physical foaming agent into the starvation zone 23, is formed in the plasticizing cylinder. An introducing speed adjusting container 300 is connected to the introducing port 202. The bomb 100 supplies the physical foaming agent to the plasticizing cylinder 210 via the introducing speed adjusting container 300. Further, a pressure boosting part 25 is provided in the inside of the starvation zone 23.

Note that although the producing apparatus 1000 has only one starvation zone 23, the producing apparatus which is usable for the embodiment is not limited to this. For example, in order to promote the permeation of the physical foaming agent into the molten resin, it is also allowable to adopt such a structure which is provided with a plurality of starvation zones 23 and a plurality of introducing ports 202 formed in the plurality of starvation zones 23, respectively, and in which the physical foaming agent is introduced into the plasticizing cylinder 210 from the plurality of introducing ports 202. Further, although the producing apparatus 1000 is the injection molding apparatus, the producing apparatus usable in the present embodiment is not limited to or restricted by this. It is allowable, for example, that the producing apparatus usable in the present embodiment is an extrusion molding apparatus.

[Method for Producing Foam-Molded Product]

(1) Plasticization and Melting of Thermoplastic Resin

Figure 1:
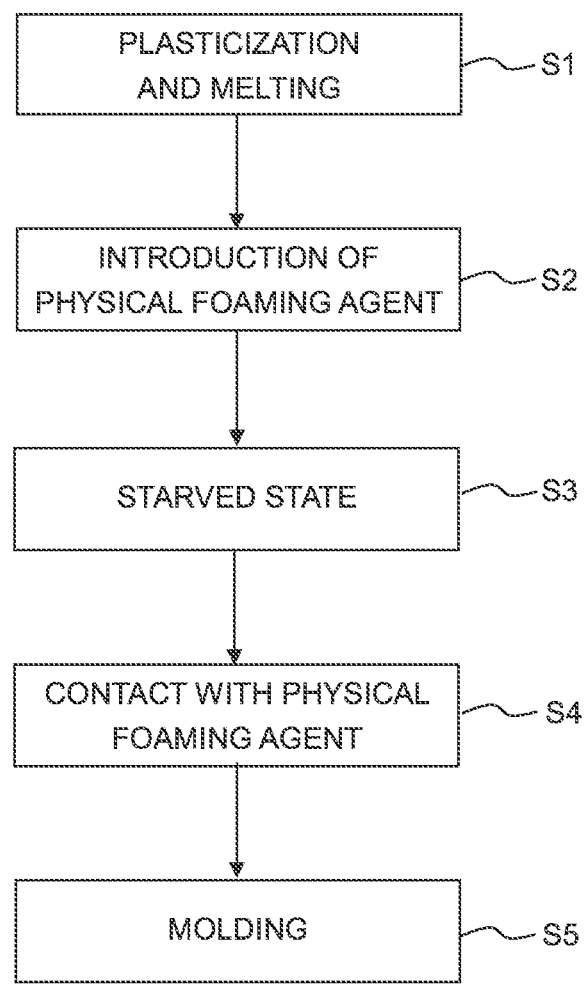
FIG. 1 is a flow chart illustrating a method for producing a foam-molded product according to an embodiment.

Firstly, the thermoplastic resin is plasticized and melt to provide the molten resin in the plasticization zone 21 of the plasticizing cylinder 210 (Step S1 depicted in FIG. 1). As for the thermoplastic resin, it is possible to use various resins depending on the type of the objective molded product. Specifically, it is possible to use, for example, thermoplastic resins such as polypropylene, polymethyl methacrylate, polyamide, polycarbonate, amorphous polyolefin, polyether imide, polyethylene terephthalate, polyether ether ketone, ABS resin (acrylonitrile butadiene styrene copolymer resin), polyphenylene sulfide, polyamide imide, polylactic acid, polycaprolactone and the like, and composite materials thereof. The above-described thermoplastic resins may be used singly, or not less than two of the above-described thermoplastic resins may be used in combination. It is also possible to use those obtained by mixing, in the above-described thermoplastic resins, various inorganic fillers such as glass fibers, talc, carbon fibers, and the like. It is preferred that the thermoplastic resin is mixed with an inorganic filler which functions as a foaming nucleating agent and/or an additive which increases the melt tension. By mixing the materials as described above with each other, it is possible to obtain fine foam cells. The thermoplastic resin of the embodiment may contain various general purpose additives other than the above, if necessary.

In the embodiment, the thermoplastic resin is plasticized and melt in the plasticizing cylinder 210 including the screw 20 provided internally as depicted in FIG. 2. A band heater (not depicted in the drawings) is arranged on an outer wall surface of the plasticizing cylinder 210, and the plasticizing cylinder 210 is heated thereby. Further, the shearing heat generated by the rotation of the screw 20 is also added, and thus the thermoplastic resin is plasticized and melt.

(2) Introduction of Physical Foaming Agent

Next, a physical foaming agent having a fixed pressure (Pc) (constant pressure or given pressure) is introduced into the starvation zone 23 (Step S2 depicted in FIG. 1).

A pressurized fluid is used as the physical foaming agent. In the embodiment, the term "fluid" means any one of liquid, gas, and supercritical fluid. Further, the physical foaming agent is preferably, for example, carbon dioxide or nitrogen in view of the cost and the load on the environment. In the embodiment, the pressure of the physical foaming agent is relatively low. Therefore, for example, it is possible to use the fluid taken out from a bomb storing therein the fluid, the bomb including, for example, a nitrogen bomb, a carbon dioxide bomb, and an air bomb, while the pressure is reduced to provide the fixed pressure by a pressure reducing valve. In this case, since there is no need to use any pressure-raising apparatus, it is possible to reduce the cost of the producing apparatus as a whole. Further, a fluid, for which the pressure is raised to a predetermined pressure, may be used as the physical foaming agent, if necessary. For example, in a case that nitrogen is used as the physical foaming agent, the physical foaming agent can be produced by the following method. At first, the air of the atmospheric air is allowed to pass through a nitrogen separation membrane while the air is being compressed by a compressor, to thereby purify the nitrogen. Subsequently, the pressure of purified nitrogen is raised to the predetermined pressure by using, for example, a booster pump or a syringe pump, and thus the physical foaming agent is produced. Further, it is allowable to use compressed air as the physical foaming agent. In the present embodiment, any forcible shearing kneading is not performed for the physical foaming agent and the molten resin. Therefore, even in a case that the compressed air is used as the physical foaming agent, oxygen which has low solubility to the molten resin hardly dissolved in the molten resin, which in turn makes it possible to suppress any oxidation degradation of the molten resin.

The pressure (Pc) of the physical foaming agent to be introduced to the starvation zone 23 is fixed pressure (constant pressure). The pressure (Pc) of the physical foaming agent is preferably in a range of 1 MPa to 20 MPa, more preferably in a range of 1 MPa to 15 MPa, further more preferably in a range of 2 MPa to 8 MPa. Although the optimum pressure is different depending on the kind of molten resin, it is possible to allow the physical foaming agent to permeate, into the molten resin, in a necessary amount for the foaming, by making the pressure of the physical foaming agent to be not less than 1 MPa, and it is possible to lower the load on the apparatus by making the pressure of the physical foaming agent to be not more than 20 MPa.

Further, in the present embodiment, although only the physical foaming agent is introduced in the starvation zone 23, it is allowable that another pressurized fluid which is different from the physical foaming agent is simultaneously introduced into the starvation zone 23 to such an extent that the effect of the present teaching is not affected thereby. In this case, the pressurized fluid containing the physical foaming agent, which is introduced into the starvation zone 23, has the fixed pressure described above.

In the embodiment, as depicted in FIG. 2, the physical foaming agent is fed from the bomb 100 via the introducing speed adjusting container 300, and the physical foaming agent is supplied from the introducing port 202 into the starvation zone 23. The pressure of the physical foaming agent is reduced to the predetermined pressure by using a pressure reducing valve 151, and then the physical foaming agent is introduced into the starvation zone 23 from the introducing port 202 without passing through, for example, a pressure raising apparatus. In the embodiment, for example, an amount of introduction and the time of introduction of the physical foaming agent which is to be introduced into the plasticizing cylinder 210 are not controlled. Therefore, it is unnecessary to provide, on an area (section or segment) ranging from the pressure reducing valve 151 to the introducing port 202, any mechanism for controlling the amount of introduction and the time of introduction of the physical foaming agent, for example, a driving valve based on the use of, for example, a check valve and/or a solenoid-operated valve. In the present embodiment also, no driving valve is provided on the area ranging from the pressure reducing valve 151 to the introducing port 202, and the area is always or normally open (open at all times). Although it is allowable to provide any check valve and/or any solenoid-operated valve on the area ranging from the pressure reducing valve 151 to the introducing port 202, the check valve and/or the solenoid-operated valve are/is configured to be always open during execution of any continuous molding cycles. Further, although the starvation zone 23 is moved in the inside of the plasticizing cylinder 210 in the front/rear direction accompanying with the backward/forward motion (advancing/retreating movement) of the screw 20, the introducing port 202 is provided such that the introducing port 202 is always positioned in the starvation zone 23.

Figure 3:
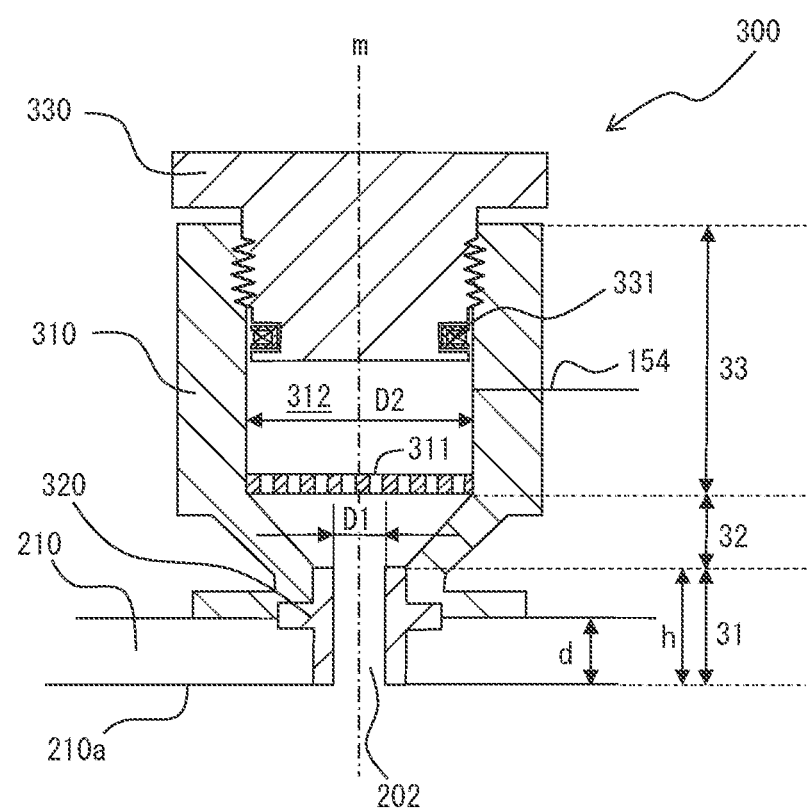
FIG. 3 is a view schematically depicting an introducing speed adjusting container used in the embodiment.

The introducing port 202 for the physical foaming agent has an inner diameter D1 which is larger than that of an introducing port for the physical foaming agent of any conventional producing apparatus. On this account, even in the case that the physical foaming agent has a relatively low pressure, the physical foaming agent can be efficiently introduced into the plasticizing cylinder 210. Further, even in a case that a part of the molten resin is solidified by being brought into contact with the introducing port 202, the introducing port 202 can function as the introducing port without being completely clogged up, owing to the large inner diameter D1. For example, in a case that the inner diameter DC of the plasticizing cylinder 210 is large, namely, in a case that the outer diameter of the plasticizing cylinder is large, the inner diameter D1 of the introducing port 202 can be easily enlarged. On the other hand, if the inner diameter D1 of the introducing port 202 is excessively large, the staying of the molten resin arises, which in turn causes any defective molding. Further, the introducing speed adjusting container 300, which is connected to the introducing port 202, is thus made large-sized, resulting in the increase in the cost of the apparatus as a whole. Specifically, the inner diameter D1 of the introducing port 202 is preferably in a range of 20% to 100% of the inner diameter DC of the plasticizing cylinder 210 and more preferably in a range of 30% to 80% of the inner diameter DC of the plasticizing cylinder 210. Alternatively, the inner diameter D1 of the introducing port 202 is preferably in a range of 3 mm to 150 mm and more preferably in a range of 5 mm to 100 mm, without depending on the inner diameter DC of the plasticizing cylinder 210. Here, the term "inner diameter DC of the introducing port 202" means the inner diameter inside an opening on an inner wall 210a of the plasticizing cylinder 210, as depicted in FIG. 3. Further, the shape of the introducing port 202, namely, the shape of the opening on the inner wall 210a of the plasticizing cylinder 210 is not limited to or restricted by a perfect (true) circle, and may be an oval or a polygon. In a case that the shape of the introducing port 202 is the oval or polygon, the diameter in a perfect circle having a same area as the area of the introducing port 202 is defined as the "inner diameter D1 of the introducing port 202".

<Introducing Speed Adjusting Container>

In the following, the introducing speed adjusting container 300 which is connected to the introducing port 202 will be explained. The introducing speed adjusting container 300, which is connected to the introducing port 202, has a volume which is not less than a certain value. Accordingly, it is possible to obtain a slow or gentle flow rate of the physical foaming agent introduced into the plasticizing cylinder 210, and it is possible to secure the time for enabling the physical foaming agent to stay in the introducing speed adjusting container 300. The introducing speed adjusting container 300 is directly connected to the plasticizing cylinder 210 which is heated by a band heater (not depicted in the drawings) arranged to surround the plasticizing cylinder 210, to thereby allow the heat of the plasticizing cylinder 210 to be conducted to the introducing speed adjusting container 300. With this, the physical foaming agent in the inside of the introducing speed adjusting container 300 is warmed, which in turn makes the difference in temperature between the physical foaming agent and the molten resin to be small and suppresses any excessive lowering in the temperature of the molten resin with which the physical foaming agent makes contact, thereby making it possible to stabilize the amount of dissolution (amount of permeation) of the physical foaming agent into the molten resin. Namely, the introducing speed adjusting container 300 functions as a buffer container having a warming (heating) function for the physical foaming agent. On the other hand, if the volume of the introducing speed adjusting container 300 is excessively large, it is not possible to warm (heat) the physical foaming agent up to an appropriate temperature, and the cost of the apparatus as a whole is increased. Although depending on the amount of the molten resin existing in the starvation zone 23, the volume of the introducing speed adjusting container 300 is preferably in a range of 5 mL to 20 L, more preferably in a range of 10 mL to 2 L, and further more preferably in a range of 10 mL to 1 L. In a case that the volume of the introducing speed adjusting container 300 is within this range, it is possible to secure the time for enabling the physical foaming agent to stay while taking the cost into consideration.

Further, as will be described later on, by bringing the physical foaming agent into contact with the molten resin, the physical foaming agent permeates into the molten resin. Thus, the physical foaming agent is consumed in the plasticizing cylinder 210 in an amount, and the physical foaming agent is introduced from the introducing speed adjusting container 300 into the starvation zone 23 in an amount corresponding to the consumed amount. If the volume of the introducing speed adjusting container 300 is excessively small, then the frequency of replacement of the physical foaming agent is increased, and thus the temperature of the physical foaming agent becomes unstable. As a result, it is feared that the supply of the physical foaming agent might become unstable. Therefore, it is preferred that the introducing speed adjusting container 300 has such a volume that the physical foaming agent can stay in the introducing speed adjusting container 300 in an amount which corresponds to the amount consumed in the plasticizing cylinder for 1 minute to 10 minutes. Further, the volume of the introducing speed adjusting container 300 is, for example, preferably in a range of 0.1 times to 5 times, more preferably in a range of 0.5 times to 2 times, the volume of the starvation zone 23 to which the introducing speed adjusting container 300 is connected. In the present embodiment, the term "volume of the starvation zone 23" means volume of an area (23) which is located downstream of a seal part 26 of the screw 20 and located upstream of a recompression zone 24 (to be described later on) wherein the molten resin is compressed and the pressure is increased, as depicted in FIG. 2, in a vacant plasticizing cylinder 210 not containing the molten resin therein. In the starvation zone 23, diameter $DS_3$ of the shaft of the screw 20 and the depth of the screw flight are constant in a part (different part), of the starvation zone 23, which is different from the pressure boosting part 25.

The introducing speed adjusting container 300 used in the present embodiment is mainly constructed of a container body 310 having a tubular (cylindrical) shape, a connecting member 320 connecting the container body 310 to the plasticizing cylinder 210, and a lid 330 of the container body 310, as depicted in FIG. 3. One end part of the container body 310 having the tubular shape is connected to the introducing port 202 via the connecting member 320; an inner space 312 of the container body 310 is communicated, via the introducing port 202, with the starvation zone 23 of the plasticizing cylinder 210. Further, the lid 330 is provided, in an openable/closable manner, on the other end part (end part on the side opposite to the introducing part 202) of the container body 310 having the tubular shape. Furthermore, a piping 154 via which the physical foaming member is supplied to the inner space 312 is connected to the container body 310.

Further, in a case of focusing on the shape of the inner space 312 of the introducing speed adjusting container 300, the introducing speed adjusting container 300 has a first straight part 31 which is connected to the introducing port 202, which has a tubular (cylindrical) shape and of which inner diameter is not changed; a tapered part 32 which is arranged adjacent to the first straight part 31 and of which inner diameter becomes greater as separating away farther from the introducing port 202; and a second straight part 33 which is arranged adjacent to the tapered part 32, which has a tubular (cylindrical) shape and of which inner diameter is not changed. Namely, as depicted in FIG. 3, the introducing speed adjusting container 300 has a configuration wherein the first straight part 31 which is a tube (cylinder) having a small inner diameter D1 and the second straight part 33 which is a tube (cylinder) having a large inner diameter D2 are arranged such that central axes thereof, respectively, are aligned in a same straight line m, and the first straight part 31 and the second straight part 33 are connected with a tapered surface of the tapered part 32. In the present embodiment, the extending direction of the straight line m coincident with the central axes of the first straight part 31 and the second straight part 33, respectively, is coincident with the extending direction of the introducing velocity adjusting container 300 which has the tubular shape. In the present embodiment, the first straight part 31 is constructed of the connecting member 320, and the tapered part 32 and the second straight part 33 are constructed of the container body 310.

A maximum value D2 of the inner diameter of the introducing speed adjusting container 300 is greater than the inner diameter D1 of the introducing port 202 (D2>D1). Here, the term "maximum value D2 of the inner diameter of the introducing speed adjusting container 300" means inner diameter of a cross section having the maximum area (hereinafter referred to as a "maximum cross section") in the cross section of the inner space 312 which is orthogonal to the extending direction (straight line m) of the introducing velocity adjusting container 300 which has the tubular shape. Further, the shape of the maximum cross section is not limited to or restricted by a perfect circle, and may be an oval or a polygon. In such a case, the diameter of a perfect circle having a same area as the area of the maximum cross section is defined as the "maximum value D2 of the inner diameter of the introducing speed adjusting container 300". In the present embodiment, the inner diameter D1 of the introducing port 202 is equal to the inner diameter of the first straight part 31, namely, the inner diameter of the connecting member 320; and the maximum value D2 of the inner diameter of the introducing speed adjusting container 300 is equal to the inner diameter of the second straight part 33 of the container body 310. The introducing speed adjusting container 300 having this feature (D2>D1) achieves, for example, the following effects.

For example, in the introducing speed adjusting container 300, the first straight part 31 having the inner diameter D1 of the introducing port 202 is connected to the tapered part 32, thereby allowing the inner diameter to be gradually greater from the inner diameter D1 to the inner diameter D2, which in turn makes it possible to easily secure a flow channel for the physical foaming agent. Although the molten resin is present in the starvation zone 23 in the starved state, there still is such a case that the molten resin enters into or swells into the inside of the introducing speed adjusting container 300, from the introducing port 202. In such a case, the heat of the molten resin is taken by (conducted to) the introducing speed adjusting container 300, which in turn increase the viscosity of the molten resin, resulting in the lowered fluidity of the molten resin. In a case that the temperature of the molten resin is further lowered, the molten resin is solidified. Owing to this solidification, although it is possible to prevent the molten resin from entering into the inside of the introducing speed adjusting container 300, if the solidified molten resin clogs the flow channel of the physical foaming agent completely, there arises such a problem that the physical foaming agent cannot be supplied to the starvation zone 23. In view of this situation, in the introducing speed adjusting container 300 of the present embodiment, the first straight part 31 having the inner diameter D1 of the introducing port 202 is connected to the tapered part 32, thereby allowing the inner diameter of the introducing speed adjusting container 300 to become gradually larger from the inner diameter D1 into the inner diameter D2, as separating farther from the introducing port 202. As the molten resin entered into the introducing speed adjusting container 300 is away farther from the introducing port 202, the molten resin is more easily to be solidified since the heat is taken away from the molten resin more, whereas the introducing speed adjusting container 300 of the present embodiment has the inside (inner space) which becomes wider as separating farther from the introducing port 202. Accordingly, even if the molten resin which makes contact with the wall surface of the container as separating farther from the introducing port 202 is solidified, it is possible to suppress occurrence of such a situation that the introducing path for the physical foaming agent is completely clogged by the molten resin which is solidified. For example, even if the molten resin which makes contact with the wall surface of the introducing path for the physical foaming agent is solidified, the molten resin can maintain a molten state in which the molten resin has the fluidity, at a part or location in the vicinity of the center in the introducing path, for the physical foaming agent, which is separated (away) from the wall surface. With this, the flow channel for the physical foaming agent can be secured in the introducing speed adjusting container 300. Note that it is not necessarily indispensable that the tapered part 32 is connected to the end part of the first straight part 31; the flow channel for the physical foaming agent can be secured under a condition that the introducing speed adjusting container 300 is configured such that the inner diameter becomes larger from the end part of the first straight part 31.

Further, by making the maximum value D2 of the inner diameter of the introducing speed adjusting container 300 to be greater than the inner diameter D1 of the introducing port 202 (D2>D1), the warming of the physical foaming agent inside the introducing speed adjusting container 300 can be promoted by the heat conducted from the plasticizing cylinder 210. As described above, by warming the physical foaming agent inside the introducing speed adjusting container 300, it is possible to make the difference in temperature between the physical foaming agent and the molten resin to be small, thereby stabilizing the amount of dissolution (amount of permeation) of the physical foaming agent into the molten resin. Since the introducing speed adjusting container 300 of the present embodiment has the shape wherein the inside of the container is made to be wider than the introducing port 202 (D2>D1), it is possible to allow a larger amount of the physical foaming agent to stay in a lower part of the introducing speed adjusting container 300, namely, at a location close to the plasticizing cylinder 210, as compared with such a shape wherein the inside of the container has an area which is same as that of the introducing port 202 (D2=D1). Since the lower part of the introducing speed adjusting container 300 is close to the plasticizing cylinder 210, it is possible to efficiently warm a larger amount of the physical foaming agent. In particular, at a time of staring the plasticizing weighing of the molten resin, a large amount of the physical foaming agent is introduced into the starvation zone 23 from the introducing speed adjusting container 300. Even in such a case, the introducing speed adjusting container 300 of the present embodiment is capable of introducing a large amount of the warmed physical foaming agent into the starvation zone 23. Note that in the present embodiment, in the cross section of the introducing speed adjusting container 300 including the straight line m, the angle of the inner wall, of the tapered part 32, with respect to the extending direction (straight line m) of the introducing speed adjusting container 300 is made to be 45 degrees, as depicted in FIG. 3. However, a range of not less than 20 degrees to not more than 90 degrees is defined as a preferred range for the angle of the inner wall in view of achieving the above-described effects, and a range of not less than 25 degrees to not more than 65 degrees is most effective range in view of achieving the above-described effects. Note that a case wherein the angle of the inner wall of the tapered part 32 is 90 degrees means such a case wherein the first straight part 31 and the second straight part 33 are connected by a plane orthogonal to the straight line m.

Since the maximum value D2 of the inner diameter of the introducing speed adjusting container 300 is greater than the inner diameter D1 of the introducing port 202 (D2>D1), a ratio (D2/D1) of the maximum value D2 of the inner diameter of the introducing speed adjusting container 300 to the inner diameter D1 of the introducing port 202 is greater than 1 (one). In view of further promoting the above-described effects, the ratio (D2/D1) is preferably not less than 2. On the other hand, in view of suppressing the cost of the apparatus, the introducing speed adjusting container 300 is preferably small, and thus the ratio (D2/D1) is, for example, not more than 20, and is preferably not more than 10.

In a case that the inner diameter D1 of the introducing port 202 is relatively large, for example, in such a case that the inner diameter D1 of the introducing port 202 is not less than 60 mm, preferably not less than 80 mm, the above-described fear that the introducing port 202 might be clogged by the swelling of the molten resin is less likely to occur. Thus, the above-described ratio (D2/D1) may be relatively small. In such a case, the ratio (D2/D1) of the maximum value (D2) of the inner diameter of the introducing speed adjusting container 300 to the inner diameter (D1) of the introducing port 202 is, for example, in a range of more than 1 to not more than 3, and preferably in a range of more than 1 to not more than 2.

On the other hand, in a case that the inner diameter D1 of the introducing port 202 is relatively large, the volume (capacity) of the introducing speed adjusting container 300 becomes large, as well. Accompanying with this, there is such a fear that the temperature gradient of the physical foaming agent which is warmed inside the introducing speed adjusting container 300 by the heat conduction from the plasticizing cylinder 210 might be large. In order to reduce the temperature gradient to be small, it is allowable to provide an agitator inside the introducing speed adjusting container 300 to thereby agitate the physical foaming agent inside the introducing speed adjusting container 300. The agitator is preferably disposed on a lower part, which is located inside the introducing speed adjusting container 300, and close to the plasticizing cylinder 210, for example, on the taper part 31 of the present embodiment. Alternatively, as another method, it is allowable to provide a porous or meshed metal plate on a lower part in the inside of the introducing speed adjusting container 300. Sine a large volume of the physical foaming agent is warmed in the present embodiment, an SUS (stainless steel) plate 311 (thickness: 5 mm) having a large number of (a plurality of) through holes formed therein is provided on and connected to the container body 310, at a bottom part of the introducing speed adjusting container 300 (an end part, of the second straight part 33, on the side of the plasticizing cylinder 210). The metal plate 311 which is warmed by the heat conducted from the container body 310 promotes the warming of the physical foaming agent, making it possible to make the temperature gradient in the lower part in the inside of the introducing speed adjusting container 300 to be small. By making the temperature gradient in the lower part in the inside of the introducing speed adjusting container 300 to be small, it is possible to further uniformize the temperature of the physical foaming agent to be introduced to the starvation zone 23.

The introducing speed adjusting container 300 of the present embodiment preferably has the tapered part 32 in which inner diameter of the introducing speed adjusting container 300 becomes greater as separating away farther from the introducing port 202, as depicted in FIG. 3. By providing such a tapered part 32 on the lower part of the introducing speed adjusting container 300, namely at the part close to the plasticizing cylinder 210, the physical foaming agent supplied from the piping 154 approaches closer to and is warmed gradually by the tapered part 32 which supplies heat, as the physical foaming agent approaches closer to the introducing port 202. With this, the temperature of the physical foaming agent to be introduced to the starvation zone 23 can be further uniformized.

In the introducing speed adjusting container 300, the length (height) h in the extending direction (straight line m in FIG. 3) of the first straight part 31 having the tubular shape is preferably not more than 2 times, more preferably not more than 1 time a thickness d of a side wall of the plasticizing cylinder 210. In a case that the length h of the first straight part 31 is within the above-described range, the fear that the flow channel of the physical foaming agent inside the introducing speed adjusting container 300 might be clogged by the solidified molten resin can be further lowered. The lower limit value of the length (height) h of the first straight part 31 having the tubular shape is not particularly limited, and is substantially, for example, not less than 0.1 times, preferably not less than 0.3 times, the thickness d of the side wall of the plasticizing cylinder 210.

The lid 330 is provided on the second straight part 33 of the container body 310 in the openable/closable manner. The lid 330 is preferably openable/closable manually by an operator, without using any special tools. In the molding of a foam-molded product, a molding condition is set in advance (setting of condition), in some cases. In the setting of molding condition, the number of rotations of a feeder screw 212 and/or the screw 20, etc., is optimized, and confirmation is made as to whether the starved state is stably generated in the starvation zone 23. At the same time with these, confirmation is also made as to whether the molten resin does not swell from the introducing port 202 into the inside of the introducing speed adjusting container 300. Therefore, it is preferred that the opening and closing of the lid 330 is performed with a simple and easy method, without using any bolts, such that any resin entering into the inside the introducing speed adjusting container 300 can be removed. By allowing the lid 300 to be openable/closable manually by the operator, the working efficiency in the setting of the molding condition is improved. Although a seal mechanism for the lid 330 is arbitrary, it is possible to use a seal mechanism having a spring built therein, or a high-pressure seal mechanism of the clutch system, etc. The present embodiment uses a seal member 331 formed of polyimide and having a spring built therein. The seal member 331 swells due to the gas pressure of the physical foaming agent staying inside the inner space 312, thereby enhancing the seal property.

The material constructing the introducing speed adjusting container 300 is preferably a material which is pressure-resistant in view of containing a pressurized fluid, which has preferably a large heat capacity and in which the temperature is not easily increased, and which is capable of taking the heat easily from any resin adhered thereto, in view of promoting the solidification of the molten resin in the wall surface and in view of suppressing the entrance of the molten resin in the inside of the container. Further, the material is preferably a material which has a high thermal conductivity and to which the heat is easily conducted from the container body 310, in view of warming the physical foaming agent. From these viewpoints, the introducing speed adjusting container 300 is preferably formed, for example, of a metal such as stainless steel (SUS), etc. This is applicable similarly to the connecting member 320, as well.

The inner wall of the introducing speed adjusting container 300, namely an inner wall defining the inner space 312 is preferably formed with a plating film containing Teflon (trade name) (polytetrafluoroethylene, PTFE). The plating film containing Teflon (trade name) may be formed in the entire inner wall of the introducing speed adjusting container 300, or may be formed only a part or portion of the inner wall of the introducing speed adjusting container 300. In particular, the plating film containing Teflon (trade name) is preferably formed in the lower part, in the inside of the introducing speed adjusting container 300, in which there is a fear of contacting with the molten resin, for example, in the inner surface(s) of the first straight part 31 and/or the tapered part 32. In a case that a long period of time elapses in a state that the resin is adhered to the inner wall during the molding of the foam-molded product, the resin is carbonized and firmly fixed to and then is comes off from the inner wall, which might result in any molding failure or unsatisfactory molding. By forming the plating film containing Teflon (trade name) in the inner wall of the introducing speed adjusting container 300, it is possible to suppress the firmly fixing of the molten resin as described above. The plate film containing Teflon (trade name), particularly an electroless nickel/phosphorous plating film containing Teflon (trade name) has high heat resistance and high abrasion or scratch resistance, has high hardness, and further has excellent covering property with respect to a plated product (plating target) having a complex shape, as well. Further, as another surface treating method which is capable of imparting the water repellency or oil repellency to the inner wall of the introducing speed adjusting container 300, and which has excellent heat resistance is exemplified by a surface treating processing using an excimer laser. However, performing the surface treating processing using the excimer laser with respect to the inner wall of the introducing speed adjusting container 300 is quite difficult, and thus the formation of the plating film containing Teflon (trade name) is preferred. The content amount of Teflon (trade name) in the electroless plating film is preferably in a range of 10% by weight to 50% by weight, in view of the balance between the stability of the plating film and the release property of the adhered molten resin.

In the foregoing, the introducing speed adjusting container 300 used in the present embodiment has been explained. The introducing speed adjusting container 300 used in the present embodiment, however, is not limited to or restricted by the above-described configuration. For example, as a first modification, there is provided a configuration wherein the introducing speed adjusting container does not have the tapered part 32. Namely, it is allowable that the first straight part 31 and the second straight part 33 are connected by a surface orthogonal to the extending direction (straight line m) of the introducing speed adjusting container 300 which has the tubular shape, rather than being connected by the tapered surface. Further, as a second modification, there is provided a configuration wherein the introducing speed adjusting container 300 does not have the first straight part 31. In this case, the tapered part 32 is connected to the introducing port 202 which is the opening part on the inner wall 210a of the plasticizing cylinder 210. Namely, there is provided such a configuration that the inner diameter of the introducing speed adjusting container 300 becomes wider as separating away farther from the inner wall 210a, also in the side wall of the plasticizing cylinder 210.

Note that the introducing speed adjusting container 300 may be a container which is a separate body from the plasticizing cylinder 210, or that the introducing speed adjusting container 300 may be formed integrally with the plasticizing cylinder 210, and may construct a part or portion of the plasticizing cylinder 210.

(3) Allowing Molten Resin to be in Starved State

Next, the molten resin is caused to flow to the starvation zone 23 so that the molten resin is allowed to be in the starved state in the starvation zone 23 (step S3 in FIG. 1). The starved state is determined by the balance between a feeding amount of the molten resin from the upstream of the starvation zone 23 to the starvation zone 23 and a feeding amount of the molten resin fed from the starvation zone 23 to the downstream of the starvation zone 23; in a case that the former feeding amount is smaller than the latter feeding amount, there is provided the starved state.

In the present embodiment, a compression zone 22, in which the molten resin is compressed to thereby increase the pressure, is arranged on the upstream side of the starvation zone 23 to thereby allow the molten resin to be in the starved state in the starvation zone 23. The compression zone 22 is provided with a large diameter part 20A in which the diameter (screw diameter) of the shaft of the screw 20 is larger (thicker) than that of the plasticization zone 21 positioned on the upstream side, and in which the screw flight is shallowed in a stepwise manner. Further, a seal part 26 is provided on the downstream side of and to be adjacent to the large diameter part 20A. The seal part 26 has a configuration similar to that of the large diameter part 20A in which in the diameter of the shaft of the screw 20 is large (thick), and further in which the screw flight is not provided; rather, a plurality of shallow grooves are formed in the shaft of the screw 20, instead of the screw flight. In each of the large diameter part 20A and the seal part 26, the diameter of the shaft of the screw 20 is made to be large to thereby make it possible to decrease the clearance between the inner wall of the plasticizing cylinder 210 and the screw 20 and to lower the resin feed amount of the molten resin to be fed to the downstream side, thus increasing the flow resistance of the molten resin. Accordingly, in the present embodiment, the large diameter part 20A and the seal part 26 are a mechanism for increasing the flow resistance of the molten resin. Note that the seal part 26 also achieves such an effect of suppressing any backward movement (backflow) of the physical foaming agent, namely the movement of the physical foaming agent from the downstream side to the upstream side of the seal part 26.

Owing to the presence of the large diameter part 20A and the seal part 26, a resin flow amount (resin flow rate) to be supplied from the compression zone 22 to the starvation zone 23 is lowered, and the molten resin is compressed in the compression zone 22 on the upstream side to increase the pressure of the molten resin, and the molten resin is unfulfilled (is in the starved state) in the starvation zone 23 on the downstream side. In order to promote the starved state of the molten resin, the screw 20 has a structure wherein the diameter of the shaft at a part or portion positioned in the starvation zone 23 is small (thin) and the screw flight is deep, as compared with another part or portion positioned in the compression zone 22.

The mechanism, which is provided in the compression zone 22 and which increases the flow resistance of the molten resin, is not specifically limited, provided that the mechanism temporarily reduces the flow passage area for allowing the molten resin to pass in order to restrict the flow rate of the resin supplied from the compression zone 22 to the starvation zone 23. In the present embodiment, although both of the large diameter portion 20A the seal part 26 of the screw are used, it is allowable to use only one of the large diameter portion 20A and the seal part 26. The mechanism which is configured to increase the flow resistance and which is different from the large diameter part 20A and the seal part 26 of the screw is exemplified, for example, by a mechanism with a configuration wherein the screw flight is provided at a part of the screw in a reverse direction to that in the other part of the screw, a mechanism with a configuration wherein a labyrinth structure is provided on the screw, etc.

The mechanism for increasing the flow resistance of the molten resin may be provided for the screw, for example, as a ring which is a member separate from the screw. Alternatively, the mechanism may be provided integrally with the screw as a part of the structure of the screw. In a case that the mechanism for increasing the flow resistance of the molten resin is provided, for example, as the ring which is the member separate from the screw, the size of the clearance portion as the flow passage for the molten resin can be changed by changing the ring, thus providing such an advantage that the magnitude of the flow resistance of the molten resin can be easily changed.

Further, other than the mechanism for increasing the flow resistance of the molten resin, it is also possible to allow the molten resin to be in the starved state in the starvation zone 23 by providing, between the compression zone 22 and the starvation zone 23, a counter flow (backward flow) preventing mechanism (seal mechanism), which prevents any counter flow (backward flow) of the molten resin from the starvation zone 23 to the compression zone 22 which is located upstream of the starvation zone 23. For example, the counter flow preventing mechanism can be exemplified by a seal mechanism including, for example, a steel ball or a ring which is movable to the upstream side in accordance with the pressure of the physical foaming agent. Note that, however, the counter flow preventing mechanism requires a driving portion, and hence there is such a fear that the resin might stay. On this account, it is preferred to use the mechanism for increasing the flow resistance having no driving portion.

In the present embodiment, in order to stabilize the starved state of the molten resin in the starvation zone 23, it is also allowable to control the supply amount of the thermoplastic resin to be supplied to the plasticizing cylinder 210, for the following reason. Namely, if the supply amount of the thermoplastic resin is excessively large, it is difficult to maintain the starved state. In the present embodiment, the supply amount of the thermoplastic resin is controlled by using a general purpose feeder screw 212. By restricting the supply amount of the thermoplastic resin, the weighting speed of the molten resin in the starvation zone 23 becomes greater than the plasticizing speed in the compression zone 22. As a result, the density of the molten resin in the starvation zone 23 is stably lowered, thereby promoting the permeation of the physical foaming agent into the molten resin.

In the present embodiment, it is preferred that the length of the starvation zone 23 in the flow direction of the molten resin is long in order to secure an contact area and a contact time between the molten resin and the physical foaming agent. However, if the length of the starvation zone 23 is excessively long, a harmful influence arises such that the molding cycle and/or the screw length are prolonged or lengthened. On this account, the length of the starvation zone 23 is preferably in a range of 2 times to 12 times the inner diameter DC of the plasticizing cylinder 210, and more preferably in a range of 4 times to 10 times the inner diameter DC of the plasticizing cylinder 210. Further, it is preferred that the length of the starvation zone 23 covers the entire range of the weighing stroke in the injection molding. Namely, it is preferred that the length of the starvation zone 23 in the flow direction of the molten resin is not less than the length of the weighing stroke in the injection molding. The screw 20 is moved frontwardly and backwardly in accordance with the plasticization and weighing, and the injection of the molten resin. By making the length of the starvation zone 23 to be not less than the length of the weighing stroke, the introducing port 202 can be arranged (formed) in the starvation zone 23 at all times during the production of the foam-molded product. In other words, even in a case that the screw 20 is moved frontwardly and backwardly during the production of the foam-molded product, any zone which is different from the starvation zone 23 is not located at (is moved to) the position of the introducing port 202. Accordingly, the physical foaming agent, which is introduced from the introducing port 202, is constantly introduced into the starvation zone 23 during the production of the foam-molded product. As depicted in FIG. 2, the length of the starvation zone 23 of the present embodiment is a length, in the screw 20, from the downstream of the seal part 26 up to the upstream of a recompression zone 24 (to be described later on) in which the molten resin is compressed and the pressure is raised. In the starvation zone 23, a diameter $DS_3$ of the shaft of the screw 20 and the depth of the screw flight are constant in a part or portion (different part or portion) which is different from the pressure boosting part 25 (to be described later on).

(4) Bringing Molten Resin and Physical Foaming Agent into Contact with Each Other In the next place, the molten resin in the starved state and the physical foaming agent having the fixed pressure are brought in contact with each other in the starvation zone 23 (Step S4 depicted in FIG. 1). Namely, the molten resin is pressurized at the fixed pressure by the physical foaming agent in the starvation zone 23. The starvation zone 23 is unfulfilled with the molten resin (starved state), and there is the space in which the physical foaming agent can exist. Therefore, the physical foaming agent and the molten resin can be efficiently brought into contact with each other. The physical foaming agent, which is brought into contact with the molten resin, permeates into the molten resin, and the physical foaming agent is consumed. In a case that the physical foaming agent is consumed, the physical foaming agent, which stays in the introducing speed adjusting container 300, is supplied to the starvation zone 23, and the molten resin is continuously brought into contact with the physical foaming agent having the fixed pressure.

In the case of the conventional foam molding based on the use of the physical foaming agent, the physical foaming agent at a high pressure, which is in a predetermined amount, has been forcibly introduced into the plasticizing cylinder within a predetermined time. Therefore, it has been necessary that the pressure of the physical foaming agent is raised to the high pressure and that amount of introduction, the time of introduction into the molten resin and the like of the physical foaming agent are correctly controlled, and thus the physical foaming agent is brought into contact with the molten resin for only the short time of introduction. In contrast, in the present embodiment, the physical foaming agent is not forcibly introduced into the plasticizing cylinder 210; rather, the physical foaming agent having the fixed pressure is continuously supplied into the plasticizing cylinder, and the physical foaming agent is continuously brought into contact with the molten resin. Accordingly, the amount of dissolution (amount of permeation) of the physical foaming agent into the molten resin, which is determined by the temperature and the pressure, is stabilized. Further, the physical foaming agent of the present embodiment is constantly brought into contact with the molten resin. Therefore, the physical foaming agent, which is in the necessary and sufficient amount, can permeate into the molten resin. Accordingly, in the foam-molded product produced in the present embodiment, the foam cells are fine (minute), regardless of using the physical foaming agent having the low pressure as compared with any conventional molding method based on the use of the physical foaming agent.

Further, in the production method of the present embodiment, since there is no need to control, for example, the amount of introduction and the time of introduction of the physical foaming agent, there is no need to provide any driving valve including, for example a check valve and a solenoid-operated valve as well as any control mechanism for controlling the same, thereby making it possible to suppress the apparatus cost. Further, the physical foaming agent, which is used in the present embodiment, has the pressure lower than that of any conventional physical foaming agent. Therefore, the load on the apparatus is small as well.

In the present embodiment, all of the steps of the method for producing the foam-molded product are carried out, while continuously supplying the physical foaming agent having the fixed pressure in order to supplement the physical foaming agent consumed in the plasticizing cylinder. Further, in the present embodiment, for example, in a case that the injection molding is continuously performed for a plurality of shots, the molten resin, which corresponds to a next shot, is also prepared in the plasticizing cylinder during the period in which an injection step, a cooling step for the molded product, and a taking out step for the molded product for the current shot are performed. The molten resin, which corresponds to the next shot, is pressurized at the fixed pressure by the physical foaming agent. Namely, in the case of the injection molding for the plurality of shots performed continuously, 1 cycle of the injection molding, which includes, for example, the plasticization and weighing step, the injection step, the cooling step for the molded product, and the taking out step, is performed in the state in which the molten resin and the physical foaming agent having the fixed pressure are constantly present and brought into contact with each other in the plasticizing cylinder, namely in the state in which the molten resin is constantly pressurized at the fixed pressure by the physical foaming agent in the plasticizing cylinder. Similarly, in a case that the continuous molding such as the extrusion molding or the like is performed, the molding is also performed in the state in which the molten resin and the physical foaming agent having the fixed pressure are constantly present and brought into contact with each other in the plasticizing cylinder, namely in the state in which the molten resin is constantly pressurized at the fixed pressure by the physical foaming agent in the plasticizing cylinder.

Further, in the present embodiment, the pressure boosting part 25 is provided in the inside of the starvation zone 23. In the following, the pressure boosting part 25 will be explained.

<Pressure Boosting Part Inside Starvation Zone>

The pressure boosting part 25 is formed of a part or portion of the plasticizing screw 20. In the pressure boosting part 25, the diameter (screw diameter) of the shaft of the screw 20 is great and the depth of the screw flight is shallow, as compared with other parts or portions located on the upstream and the downstream, respectively, of the pressure boosting part 25. Namely, in the starvation zone 23, the diameter of the shaft of the screw 20 in the pressure boosting part 25 is greater than the diameter $DS_3$ of the shaft of the screw 20 in the different part(s) or portion(s) different from the pressure boosting part 25. Note that in the starvation zone 23 of the present embodiment, the diameter $DS_3$ of the shaft of the screw 20 is constant in the different part which is different from the pressure boosting part 25. In the present embodiment, the pressure boosting part 25 promotes the permeation of the physical foaming agent with respect to the molten resin, and also suppresses the separation of the physical foaming agent from the molten resin. The mechanism therefor is presumed as follows. Namely, in the pressure boosting part 25, the diameter of the shaft of the screw 20 is made to be large, thereby decreasing the clearance between the inner wall of the plasticizing cylinder 210 and the screw 20, thus compressing the molten resin passing through the clearance. Accordingly, the resin density of the molten resin is temporarily increased only when the molten resin passes through the pressure boosting part 25. This creates a weak mixing effect (mixture effect), which is presumed to promote the permeation of the physical foaming agent into the molten resin, and to suppress the separation of the physical foaming agent from the molten resin. This mechanism, however, is a presumed mechanism, and the present teaching is not limited to or restricted by this presumed mechanism. Note that since the resin density in the pressure boosting part 25 is higher than the different part therearound (a part, in the starvation zone 23, which is different from the pressure boosting part 25), the pressure boosting part 25 is also a high-resin density part.

A maximum value $DS_1$ of the diameter of the shaft of the screw 20 in the pressure boosting part 25 is preferably smaller than a maximum value $DS_2$ of the diameter of the shaft of the screw 20 in the compression zone 22. By making the maximum value $DS_1$ to be smaller than the maximum value $DS_2$, it is possible to suppress such a phenomenon that the molten resin is swelled out from the introducing port 202 for the physical foaming agent, namely, the so-called vent-up. Further, the maximum value $DS_1$ of the diameter of the shaft of the screw 20 in the pressure boosting part 25 preferably satisfies the following expression (1). By making the maximum value $DS_1$ to be greater than 0.5 times the maximum value $DS_2$ (0.5 $DS_2$), the mixing of the molten resin and the physical foaming agent is more promoted, and by making the maximum value $DS_1$ to be smaller than 0.95 times the maximum value $DS_2$ (0.95 $DS_2$), the vent-up can be suppressed further.

$$0.5DS_2 < DS_1 < 0.95DS_2 \qquad (1)$$

In the expression (1),
$DS_1$: the maximum value of the diameter of the shaft of the screw 20 in the pressure boosting part 25, and
$DS_2$: the maximum value of the diameter of the shaft of the screw 20 in the compression zone 22.

It is allowable that only one piece of the pressure boosting part 25 is provided in the inside of the starvation zone 23, or a plurality of pieces of the pressure boosting part 25 is provided in the inside of the starvation zone 23. Note that, however, if the number of the pressure boosting part 25 is too large, the risk of the vent-up is increased, and thus the number of the pressure boosting part 25 is preferably in a range of 1 piece to 3 pieces. Further, a length L of the pressure boosting part 25 in the extending direction of the screw 20 (flowing direction of the molten resin) preferably satisfies the following expression (2). By making the length L of the pressure boosting part 25 to be not less than 0.5 times the inner diameter DC (0.5 DC), the mixing of the molten resin and the physical foaming agent is more promoted, and by making the length L of the pressure boosting part 25 to be not more than 2 times the inner diameter DC (2 DC), the vent-up can be suppressed.

$$0.5DC \leq L \leq 2DC \quad (2)$$

In the expression (2),

L: the length of the pressure boosting part 25 in the extending direction of the screw 20, and DC: the inner diameter of the plasticizing cylinder 210.

It is possible to optimize the position, the size (dimension), etc., of the pressure boosting part 25 of the present embodiment, based on the entire configuration of the screw 20 and the plasticizing cylinder 210 as a whole.

Although the pressure boosting part 25 achieves the above-described effect regardless of the magnitude of the dimension of the plasticizing cylinder 210, the pressure boosting part 25 functions particularly effectively in a relatively large-sized plasticizing cylinder. The term "relatively large-sized plasticizing cylinder" means, for example, such a case that the inner diameter DC of the plasticizing cylinder 210 is not less than 60 mm, or not less than 80 mm. In the large-sized plasticizing cylinder, the amount of the molten resin existing in the starvation zone 23 is increased, and the contact area between the molten resin and the physical foaming agent is decreased; thus, there is such a fear that it might be difficult to permeate any sufficient amount of the physical foaming agent into the molten resin, and also such a fear that the physical foaming agent might be separated from the molten resin is increased. Even in such a case, owing to the provision of the pressure boosting part 25 in the inside of the starvation zone 23, the permeation of the physical foaming agent into the molten resin can be promoted. Further, by mixing the molten resin and the physical foaming agent while performing the compression temporarily in the pressure boosting part 25, it is possible to uniformize the amount of dissolution (amount of permeation) of the physical foaming agent in (into) the molten resin in the depth direction of the screw flight. With this, the concentration of the physical foaming agent in the molten resin is increased, which in turn makes it possible to suppress occurrence of such a phenomenon which is a factor causing any unsatisfactory molding and in which the physical foaming agent separated from the molten resin is wrapped up again by the molten resin in the recompression zone 24 on the downstream of the starvation zone 23.

In a case that the fixed pressure (constant pressure) (Pc) of the physical forming agent introduced in the starvation zone 23 is relatively low, for example, less than 6 MPa, or not more than 4 MPa, there is such a tendency that the pressure in the starvation zone 23, except for the pressure boosting part 25, is maintained at a fixed pressure (Pc) which is same as that of the physical foaming agent introduced in the starvation zone 23, and that the pressure of the molten resin in the pressure boosting part 25 becomes higher than the fixed pressure (Pc) of the physical foaming agent introduced in the starvation zone 23. In view of suppressing the vent-up, the absolute value of difference (range of pressure fluctuation: $\Delta P = Pmax \cdot Pc$) between a maximum value (Pmax) of the pressure of the molten resin in the pressure boosting part 25 and the above-described fixed pressure (Pc) is preferably not more than 4 MPa, more preferably not more than 2 MPa. In the present embodiment, the phrase that the pressure is "constant" means that the range of pressure fluctuation is preferably within ±20%, more preferably within ±10%. By maintaining the pressure in the different part of the starvation zone 23, which is different from the pressure boosting part 25, at the fixed pressure (Pc), the amount of dissolution (amount of permeation) of the physical foaming agent in (into) the molten resin, which is determined by the temperature and the pressure, is stabilized.

The pressure in the starvation zone 23 is measured, for example, by a pressure sensor 27 provided in the inside the starvation zone 23 of the plasticizing cylinder 210. Note that although accompanying with the backward/forward motion (advancing/retreating movement) of the screw 20, the starvation zone 23 is moved in the inside of the plasticizing cylinder 210 in the front/rear direction, the pressure sensor 27 depicted in FIG. 2 is arranged at such a position that the pressure sensor 27 is located always inside the starvation zone 23 at a forward-most advancing position and at a backward-most retreating position of the starvation zone 23. Further, in the present embodiment, at the forward-most advancing position of the screw 20 (FIG. 2), the pressure sensor 27 is located immediately below the pressure boosting part 25. With this, the pressure sensor 27 is capable of measuring also the pressure of the molten resin in the pressure boosting part 25, which makes it easy to set the molding condition in such a case that the kind of the foam-molded product to be produced, a resin material, etc., are changed.

In a case that the fixed pressure (Pc) of the physical foaming agent which is introduced is relatively low, the pressure measured by the pressure sensor 27 temporarily indicates a value higher than the fixed pressure (Pc) immediately after the plasticizing weighing of the molten resin has been started, but the pressure is lowered soon thereafter, and is maintained at the fixed pressure (Pc). It is presumed that the pressure measured by the pressure sensor 27 immediately after the plasticizing weighing of the molten resin has been started is effected by the increase in density in the molten resin in the pressure boosting part 25. Due to this, the pressure measured by the pressure sensor 27 immediately after the plasticizing weighing of the molten resin has been started indicates the value higher than the fixed pressure (Pc). Afterwards, the screw 20 is moved backwardly accompanying with the plasticizing and weighting of the molten resin, which in turn causes the pressure sensor 27 and the pressure boosting part 25 are separated from each other, thus making the pressure sensor 27 to measure the pressure at the different part or portion, in the starvation zone 23, which is different from the pressure boosting part 25. Accordingly, it is presumed that the pressure measured by the pressure sensor 27 is lowered to the fixed pressure (Pc), and then is maintained to be constant.

In a case that the fixed pressure (Pc) of the physical foaming agent which is introduced is relatively high, for example, is not less than 6 MPa, or not less than 8 MPa, the pressure in the different part, in the starvation zone 23, which is different from the pressure boosting part 25, is maintained at the pressure constant (Pc) which is same as that of the introduced physical foaming agent. On the other hand, since the pressure of the molten resin in the starvation zone 23 surrounding the pressure boosting part 25 is sufficiently high, it is presumed that the pressure of the molten resin in the pressure boosting part 25 is relatively hardly affected by the structure of the pressure boosting part 25. Accordingly, an amount of increase in the pressure in the pressure boosting part 25, which is measured by the pressure sensor 27, is slight and is difficult to be observed, in some cases. Therefore, the pressure in the starvation zone 23, also including the pressure boosting part 25, is maintained at the fixed pressure (Pc) same as that of the physical foaming agent which is introduced. The pressure measured by the pressure sensor 27 tends to be maintained at the fixed pressure (Pc). Note that, however, even in such a case that the pressure of the physical foaming agent is sufficiently high, under a condition that the pressure boosting part 25 has a structure which allows the increase in pressure to be quite great, any sufficient increase in the pressure in the pressure boosting part 25 is observed, in some cases.

As described above, although the resin density is increased by the pressure boosting part 25, there are such a case that the increase in the pressure in the pressure boosting part 25 is observed, and there is also a case that the pressure is acknowledged (observed) to be constant during a molding cycle, depending on the pressure of the physical foaming agent introduced to the plasticizing cylinder 210 and/or the structure of the pressure boosting part 25. However, for example, in such a case that molding (non-foamed molding) is performed in a state that the physical foaming agent is not introduced in the plasticizing cylinder 210, then the pressure in the pressure boosting part 25 is not constant in any one of the above-described cases, and any increase in the pressure is confirmable (observable). As described above, a part having the structure which provides, in the starvation zone 23, the increase in the pressure of the molten resin with respect to a part surrounding therearound (the different part, of the starvation zone 23, which is different from the pressure boosting part 25) is defined as the pressure boosting part 25.

As explained above, in the present embodiment, the pressure boosting part 25 is formed of a part or portion of the plasticizing screw 20, as depicted in FIG. 2; the pressure boosting part 25 is a part, in the starvation zone 23, wherein the diameter (screw diameter) of the shaft of the screw 20 is greater than the diameter $DS_3$. The pressure boosting part, however, is not limited to or restricted by this configuration. It is allowable to use, for the pressure boosting part, a various kinds of aspects for compressing the molten resin passing through the pressure boosting part to thereby increase the resin density. For example, it is allowable to use a ring, etc., which is a separate member from the screw 20, as the pressure boosting part 25. Alternatively, it is allowable to use a part, in the screw 20, in which the winding direction of the screw flight is reverse to that in the other part of the screw 20, as the pressure boosting part 25. By winding the screw flight in the reverse direction, the plasticizing speed of the thermoplastic resin is temporarily slowed so as to lengthen the mixing (kneading) time, thereby making it possible to increase the resin density.

(5) Foam Molding

Next, the molten resin, which has been brought into contact with the physical foaming agent, is molded into a foam-molded product (Step S5 depicted in FIG. 1). The plasticizing cylinder 210 used in the present embodiment has a recompression zone 24 which is arranged adjacently to the starvation zone 23, on the downstream of the starvation zone 23, and in which the molten resin is compressed and the pressure is raised. At first, the molten resin in the starvation zone 23 is allowed to flow to the recompression zone 24 in accordance with the rotation of the plasticizing screw 20. The molten resin, which contains the physical foaming agent, is subjected to the pressure adjustment in the recompression zone 24, the molten resin is fed (pushed out) to the front of the plasticizing screw 20, and the molten resin is weighed. In this procedure, the molten resin, which is fed (pushed out) to the front of the plasticizing screw 20, has the internal pressure which is controlled as the screw back pressure by a hydraulic motor or an electric motor (not depicted in the drawings) connected to the back of the plasticizing screw 20. In the present embodiment, in order that the molten resin and the physical foaming agent are compatibly dissolved uniformly or homogeneously without separating the physical foaming agent from the molten resin and that the resin density is stabilized, it is preferred that the internal pressure of the molten resin pushed to the front of the plasticizing screw 20, i.e., the screw back pressure is controlled to be higher than the pressure of the starvation zone 23 retained to be fixed or constant, by about 1 MPa to 6 MPa. Note that in the present embodiment, a check ring 50 is provided at a forward end of the screw 20 so that the compressed resin, which is disposed at the front of the screw 20, does not flow backward to the upstream side. Accordingly, the pressure in the starvation zone 23 is not affected by the resin pressure at the front of the screw 20 during the weighing.

The method for molding the foam-molded product is not specifically limited. For example, the molded product can be molded, for example, by the injection foam molding, the extrusion foam molding, or the foam blow molding. In the present embodiment, the injection foam molding is performed such that the weighed molten resin is injected and charged into a cavity (not depicted in the drawings) in the mold from the plasticizing cylinder 210 as depicted in FIG. 2. As for the injection foam molding, it is allowable to use the short shot method wherein the molten resin, which is in a charge volume of 75% to 95% of the mold cavity volume, is charged into the mold cavity, and the mold cavity is subjected to the charging while expanding foams. Alternatively, it is allowable to use the core back method wherein the molten resin, which is in a charge amount of 100% of the mold cavity volume, is charged, and then the cavity volume is expanded to cause the foaming. Since the obtained foam-molded product has foam cells at the inside thereof, the contraction or shrinking of the thermoplastic resin, which is caused during the cooling, is suppressed to thereby mitigate the sink mark and the warpage, thereby making it possible to obtain a molded product having a low specific gravity.

In the production method of the present embodiment as explained above, it is unnecessary to control, for example, the amount of introduction, the time of introduction of the physical foaming agent into the molten resin, etc. Therefore, it is possible to omit or simplify the complicated control device, and to reduce the apparatus cost. Further, in the method for producing the foam-molded product of the present embodiment, the molten resin in the starved state and the physical foaming agent having the fixed pressure are brought into contact with each other in the starvation zone 23. By doing so, the amount of dissolution (amount of permeation) of the physical foaming agent with respect to the molten resin can be stabilized by the simple mechanism.

EXAMPLES

In the following, the present teaching will be further explained using Examples and Comparative Example. However, the present teaching is not limited to Examples and Comparative Example explained below.

Example 1

In Example 1, a foam-molded product was produced by using mineral-reinforced polyamide 6 (PA6) as the thermoplastic resin and utilizing nitrogen as the physical foaming agent.

(1) Producing Apparatus

In Example 1, the producing apparatus 1000 depicted in FIG. 2 used in the embodiment described above was used. Details of the producing apparatus 1000 will be explained. As described above, the producing apparatus 1000 is the injection molding apparatus including the plasticizing cylinder 210, the bomb 100 which serves as the physical foaming agent supplying mechanism for supplying the physical foaming agent to the plasticizing cylinder 210, the clamping unit (not depicted in the drawings) which is provided with the mold, and the control device (not depicted in the drawings) which is provided to control the operations of the plasticizing cylinder 210 and the clamping unit.

A shutoff valve 28, which is opened/closed in accordance with the driving of an air cylinder, is provided at a nozzle forward end 29 of the plasticizing cylinder 210, thereby making it possible to maintain the interior of the plasticizing cylinder 210 at a high pressure. A mold (not depicted in the drawings) is brought into tight contact with the nozzle forward end 29. The molten resin is injected and charged from the nozzle forward end 29 into a cavity formed by the mold. A resin supply port 201 for supplying the thermoplastic resin to the plasticizing cylinder 210 and the introducing port 202 for introducing the physical foaming agent into the plasticizing cylinder 210 are formed, in this order as seen from the upstream side, in an upper side surface of the plasticizing cylinder 210. A resin supplying hopper 211 and a feeder screw 212, and the introducing speed adjusting container 300 are arranged in the resin supply port 201 and the introducing port 202, respectively. The bomb 100 is connected to the introducing speed adjusting container 300 by the piping 154 via a pressure reducing valve 151, a pressure gauge 152 and an open valve 153. An electroless nickel/phosphorous plating film containing Teflon (trade name) was formed on the inner wall of each of the container body 300 and the connecting member 320 of the introducing speed adjusting container 300. The film thickness of the plating film was 20 μm, and the content amount of Teflon (trade name) in the plating film was approximately 30% by weight. Further, the sensor 27 for monitoring the pressure in the starvation zone 23 is provided in the inside of the starvation zone 23 of the plasticizing cylinder 210.

The screw 20 is arranged rotatably and movably back and forth in the plasticizing cylinder 210 in order to facilitate the plasticization and the melting of the thermoplastic resin and to perform the weighing and the injection of the molten resin. As described above, the screw 20 is provided with the seal part 26 and the large diameter part 20A of the screw 20, as the mechanism for increasing the flow resistance of the molten resin.

In the plasticizing cylinder 210, the thermoplastic resin is supplied from the resin supply port 201 to the inside of the plasticizing cylinder 210, the thermoplastic resin is plasticized by a band heater (not depicted in the drawings) into a molten resin, and is fed to the downstream by the normal rotation of the screw 20. Owing to the presence of the seal part 26 and the large diameter part 20A provided on the screw 20, the molten resin is compressed so as to raise the pressure thereof on the upstream side of the seal part 26, and the molten resin is unfulfilled (is in the starved state) in the starvation zone 23 on the downstream side of the seal part 26. The molten resin, which is fed further to the downstream side, is re-compressed and weighed in the vicinity of the forward end of the plasticizing cylinder 210, before the molten resin is subject to the injection.

With this, the plasticizing cylinder 210 has, in the inside thereof, from the upstream side in the following order: the plasticization zone 21 in which the thermoplastic resin is plasticized and melt into the molten resin, the compression zone 22 in which the molten resin is compressed to thereby raise the pressure, the starvation zone 23 which is unfulfilled with the molten resin, and the recompression zone 24 in which the molten resin subjected to the pressure reduction in the starvation zone 23 is compressed again.

The starvation zone 23 of the producing apparatus 1000 was provided with one piece of the pressure boosting part 25. In the starvation zone 23, the diameter $DS_3$ of the shaft of the screw 20 was constant to be 35 mm in the part (different part), of the starvation zone 23, which is different from the pressure boosting part 25; the diameter of the shaft of the screw 20 in the pressure boosting part 25 was made to be greater than the diameter $DS_3$, and the maximum value $DS_1$ thereof was made to be 60 mm. The maximum value $DS_2$ (large diameter part 20A) of the diameter of the shaft of the screw 20 in the compression zone 22 was made to be 77 mm. Accordingly, $DS_1 \approx 0.8\ DS_2$ was obtained, and the expression (1): $0.5DS_2 < DS_1 < 0.95DS_2$ was satisfied. Further, the length L of the pressure boosting part 25 in the extending direction of the screw 20 and the inner diameter DC of the plasticizing cylinder 210 were both made to be 80 mm. Accordingly, L=1.0 DC was obtained, and the expression (2): $0.5DC \leq L \leq 2DC$ was satisfied.

Furthermore, the inner diameter D1 of the introducing port 202 was made to be 32 mm. Accordingly, the inner diameter D1 of the introducing port 202 was approximately 40% of the inner diameter DC (80 mm) of the plasticizing cylinder 210. The maximum value D2 of the inner diameter of the introducing speed adjusting container 300 was made to be 100 mm. Accordingly, the maximum value D2 of the inner diameter of the introducing speed adjusting container 300 was greater than the inner diameter D1 of the introducing port (D2>D1), and the ratio (D2/D1) was approximately 3.1. Moreover, the length h of the first straight part 31 of the introducing speed adjusting container 300 was made to be 20 mm, and the thickness d of the side wall of the plasticizing cylinder 210 was made to be 40 mm. Accordingly, the length h of the first straight part 31 was 0.5 times the thickness d of the side wall of the plasticizing cylinder 210. Further, the volume of the introducing speed adjusting container 300 was made to be approximately 2 L, and the volume of the starvation zone 23 was made to 250 mL. Accordingly, the volume of the introducing speed adjusting container 300 was approximately 8 times the volume of the starvation zone 23. Furthermore, in Example 1, a mold in which the dimension of the cavity thereof was 500 mm×800 mm×3 mm was used.

(2) Production of Foam-Molded Product

In Example 1, nitrogen bombs each of which had a volume of 47 L and each of which was charged with nitrogen at 14.5 MPa was used as a plurality of pieces of the bomb 100. At first, the value of the pressure reducing valve 151 was set to 4 MPa. The bomb 100 was opened to supply nitrogen at 4 MPa from the introducing port 202 of the plasticizing cylinder 210 into the starvation zone 23 via the pressure reducing valve 151, the pressure gauge 152, and further the introducing speed adjusting container 300. During the production of the molded product, the bomb 100 was open at all times.

In the plasticizing cylinder 210, the band heater (not depicted in the drawings) was used to adjust the plasticization zone 21 at 220° C., the compression zone 22 at 240° C., the starvation zone 23 at 220° C., and the recompression zone 24 at 240° C. Then, resin pellets of the thermoplastic resin (Gramide T777-02 produced by TOYOBO) were supplied from the resin supplying hopper 211, while allowing the feeder screw 212 to rotate at the number of rotations of 30 rpm, and the screw 20 was forwardly rotated. With this, the thermoplastic resin was heated and kneaded to provide the molten resin in the plasticization zone 21.

The number of rotations of the feeder screw 212 was determined such that the resin pellets were subjected to starved supply or starved feeding, by forming a solid molded product (non-foam-molded product) in advance to thereby set the molding condition (condition setting) in Example 1. Here, the phrase the "starved feeding of the resin pellets" means that a state in which the plasticization zone 21 is not fulfilled with the resin pellets or a molten resin thereof is maintained during the feeding of the resin pellets and in which the flight of the screw 20 is exposed from the fed resin pellets or molten resin thereof. The confirmation regarding the starved feeding of the resin pellets is exemplified, for example, by a method wherein the presence or absence of the resin pellets or the molten resin thereof on the screw 20 is confirmed with an infrared sensor or a visualization camera. In Example 1, a transparent window was provided on the feeder screw 212 used in Example 1, and the state of the plasticization zone 21 located immediately below the resin supply port 201 was visually observed and confirmed via the transparent window.

By normally rotating the screw 20 at the back pressure of 7 MPa and with the number of rotations of 100 rpm, the molten resin was caused to flow from the plasticization zone 21 to the compression zone 22, and to flow further to the starvation zone 23.

Since the molten resin flowed to the starvation zone 23 through the gap between the inner wall of the plasticizing cylinder 210 and the large diameter portion 20A of the screw and the seal part 26, the supply amount of the molten resin supplied to the starvation zone 23 was restricted. With this, the molten resin was compressed to raise the pressure in the compression zone 22, and the starvation zone 23 disposed on the downstream side was unfulfilled with the molten resin (starved state). Since the starvation zone 23 was unfulfilled with the molten resin (starved state), the physical foaming agent (nitrogen) introduced from the introducing port 202 was present in the space in which the molten resin was absent; the molten resin was pressurized by the physical foaming agent. Further, when the molten resin passed through the pressure boosting part 25, the molten resin was compressed and the resin density was temporarily increased. With this, it is presumed that the permeation of the physical foaming agent with respect to the molten resin was promoted.

Further, the molten resin was fed to the recompression zone 24, and the molten resin was recompressed therein. The molten resin in an amount of one shot was weighed at the forward end of the plasticizing cylinder 210. After that, the shutoff valve 28 was opened to inject and charge the molten resin to the inside of the cavity so that the charge ratio was 90% of the volume of the cavity, and thus the foam-molded product having a flat plate shape was molded (short shot method). After the molding, the foam-molded product was taken out from the interior of the mold after waiting for the cooling of the foam-molded product. The cooling time was 50 seconds. The molding cycle was 60 seconds as the value equivalent to that of the molding cycle of a solid molded product (unfoam-molded product).

The injection molding for the molded product explained as above was continuously performed for 1,000 shots to obtain 1,000 individuals (pieces) of foam-molded products. During the production of 1,000 individuals of foam-molded products, the pressure of the starvation zone 23 in the plasticizing cylinder 210 was constantly measured by the pressure sensor 27. As a result, the measured value of the pressure sensor 27 was changed per cycle, as follows. Firstly, although the measured value was 4 MPa immediately before the start of plasticization and weighing of the molten resin, the measured value was raised up to a value in a range of 4.5 MPa to 5.5 MPa at a timing at which the screw 20 started move backwardly (started retreating) immediately after the start of plasticization and weighing of the molten resin. Afterwards, the measured value was lowered immediately, and was maintained at 4 MPa again. The time (period time) during which the pressure was not less than 4 MPa was about 2 to 3 seconds. Since the weighing time in molding of one shot in Example 1 was 30 seconds, the time (period of time) during which the pressure was not less than 4 MPa was about one tenth (about 10%) of the measuring time in the molding for one shot. Here, the term the "weighing time in the molding of one shot" means a time since the screw 20 starts to rotate normally at the forward-most advancing position, then the screw 20 weighs a predetermined amount of the molten resin while moving backwardly (retreating), and until the normal rotation of the screw 20 is stopped.

The pressure measured by the pressure sensor 27 in the range of 4.5 MPa to 5.5 MPa immediately after the starting of the plasticizing weighing of the molten resin is presumed to be the pressure of the molten resin in the pressure boosting part 25. In Example 1, the fixed pressure (Pc) of the introduced physical foaming agent was 4 MPa which was relatively low. Accordingly, it is presumed that the pressure of the molten resin in the pressure boosting part 25 was raised up to the value in the range of 4.5 MPa to 5.5 MPa which was greater than the fixed pressure (Pc=4 MPa) of the introduced physical foaming agent. On the other hand, since the time during which the measured value of the pressure sensor 27 exceeded the fixed pressure Pc (4 MPa) was about 2 to 3 seconds which was short, and then the measured value of the pressure sensor 27 became to be same as the fixed pressure Pc (4 MPa), it is presumed that the pressure in the starvation zone 23 at the part or location (different part) different from the pressure boosting part 25 was maintained at the fixed pressure Pc (4 MPa). According to the above, it is presumed that the molten resin was constantly brought into contact with the nitrogen having the fixed pressure (Pc=4 MPa) in the starvation zone 23 throughout 1 cycle of the injection molding including, for example, the plasticizing and weighing step, the injection step, the cooling step for the molded product, and the taking out step and that the molten resin was constantly brought into contact with the nitrogen having the fixed pressure in the starvation zone 23 during the continuous molding for 1,000 individuals of molded products.

The absolute value of difference (range of pressure fluctuation: $\Delta P$) between the maximum value (Pmax=5.5 MPa) of the pressure of the molten resin in the pressure boosting part 25 and the above-described fixed pressure (Pc=4 MPa) was 1.5 MPa. The ratio of the range of pressure fluctuation (ΔP) to the fixed pressure (Pc) of the introduced physical foaming agent was 1.5/4=37.5% which was relatively large. However, since the range of pressure fluctuation (ΔP) was not more than 4 MPa, any vent-up was not observed in Example 1.

The weight dispersion of the obtained 1,000 individuals of foam-molded products was evaluated by using the value (relative standard deviation value: σ/ave. (%)) obtained by dividing the standard deviation (σ) by the weight average value (ave.). As a result, (σ/ave. (%))=0.21% was obtained. An evaluation similar to the above-described evaluation was performed for the solid molded product (non-foam-molded product). As a result, (σ/ave. (%))=0.18% was obtained, which was the value equivalent to that of Example 1. According to this result, it has been revealed that the weight stability of the foam-molded product of Example 1 is equivalent to that of the solid molded product.

In Example 1, the foam-molded product, which had a specific gravity lighter than that of the solid molded product by about 10% and in which warpage thereof is corrected, was successfully produced continuously and stably. It is considered that the ratio of reduction of the specific gravity is affected by the amount of dissolution (amount of permeation) of the physical foaming agent. According to this result, it was revealed that the amount of dissolution (amount of permeation) of the physical foaming agent with respect to the molten resin was stabilized. Further, the swirl mark, in which the separated gas was transferred to the molded product surface to deteriorate the surface property, was formed only slightly. Further, the foam cells were observed for the cross section of the obtained foam-molded product. As a result, it was revealed that the average cell diameter of foam cells was 28 μm which was fine, and any breakage of foam was not observed.

After performing the molding continuously for the 1,000 shots, the introduction of the nitrogen to the introducing speed adjusting container 300 was stopped, and the molten resin inside the plasticizing cylinder 210 was exhausted (purged) by performing a purge. Afterwards, the open valve 153 was opened to thereby release the remaining pressure inside the introducing speed adjusting container 300 until the indication of the pressure gauge 152 becomes 0 (zero: the atmospheric pressure). Next, the operator waited approximately for 5 (five) minutes until swelling of the seal member 331 of the lid 330 returned to its original state. Afterwards, the operator manually opened the lid 330, the lid 330 was opened smoothly. An amount of the resin accumulated at a location in the vicinity of the first straight part 31 in the lower part of the introducing speed adjusting container 300 was small, and the accumulated resin could be taken out completely by a pair of tweezers. Namely, any resin firmly fixed to the inner wall of the introducing speed adjusting container 300 was not observed.

Although a part, of the resin taken out from the introducing port 202, which was brought into contact with the inner wall surface of the introducing port 202 was solidified, another part, of the resin taken out from the introducing port 202, which was apart or separated from the inner wall surface of the introducing port 202 was not solidified. With this, it was confirmed that although the remaining resin was present in the first straight part 31, the supply or feeding of the physical foaming agent to the starvation zone 23 was possible.

In a case that a pressure resistant container in which any plating film containing Teflon (trade name) is not formed in the inner wall surface thereof is used, rather than using the introducing speed adjusting container 300 used in Example 1, and that molding is performed with a resin material which is highly compatible with a metal, such as polyamide, it is known that the resin is firmly fixed and remains in the inner wall of the pressure resistant container; and that this remaining resin becomes any contaminant in a case that the foam molding is performed while exchanging the resin material. Since any resin firmly fixed to the inner wall of the introducing speed adjusting container 300 was not observed, the effectiveness of the plating film containing Teflon (trade name) was confirmed in Example 1.

Example 2

In Example 2, a polypropylene (PP) resin containing inorganic filler was used as the thermoplastic resin. Further, the value of the pressure reducing valve 151 was set to 10 MPa, and the core back method was used as the foam molding method. A foam-molded product was produced by a similar method to that of Example 1, except for the above-described conditions. Note that the expansion ratio of a foam-molded product to be produced, etc., can be controlled by the pressure of the physical foaming agent. Although depending on the kind of the thermoplastic resin, in a case of obtaining a foam-molded product having the expansion ratio which is not less than 2 times with the core back method, the pressure of the physical foaming agent is, for example, not less than 6 MPa, and preferably not less than 8 MPa. In Example 2, the pressure of the physical foaming agent was set relatively high which was 10 MPa in order to obtain a foam-molded product having the expansion ratio which was 3 times.

PP resin pellets containing no reinforcing material such as an inorganic filler or the like (Prime Polypro J105G produced by PRIME POLYMER) and master batch pellets containing 80% by weight of talc as an inorganic filler (MP480 produced by LION IDEMITSU COMPOSITES) were mixed with each other so that the weight ratio was 80:20. In the similar manner to that in Example 1, the mixed resin material was supplied from the resin supplying hopper 211 into the plasticizing cylinder 210 via the feeder screw 212, and the resin material was plasticized and weighed in the plasticizing cylinder 210. The shutoff valve 28 was opened, and the molten resin was injected and charged into the cavity (not depicted in the drawings) so that the charge ratio was 100% of the volume of the cavity. Three seconds thereafter, the clamping unit (not depicted in the drawings) was driven to move backwardly, and the mold was opened so that the cavity volume was expanded from 100% to 300%. Thus, the foam-molded product was molded (core back method, 3 times foaming).

After the molding, the foam-molded product was taken out from the inside of the mold after waiting for the cooling of the foam-molded product. The cooling time was 80 seconds. Note that since the core back method was used in Example 2, the wall thickness of the molded product was increased, and the thermal insulation effect was enhanced as compared with Example 1 in which the short shot method was used. For this reason, the cooling time was longer than that of Example 1.

The injection molding for molding the molded product explained above was continuously performed for 50 shots so as to obtain 50 individuals of foam-molded products. During the production of the foam-molded product, the pressure of the starvation zone 23 in the plasticizing cylinder 210 was constantly measured by the pressure sensor 27. As a result, the pressure in the starvation zone 23 was constantly at 10

MPa, and the pressure fluctuation at the time of starting the plasticization was not more than 1 MPa.

In Example 2, the fixed pressure (Pc) of the introduced physical foaming agent was 10 MPa which was relatively high. Accordingly, it is presumed that the pressure in the starvation zone 23 was not affected by the increase in the pressure in the pressure boosting part 25, and that the pressure in the starvation zone 23 was maintained at the fixed pressure (Pc) which is same as that of the introduced physical foaming agent. Therefore, it is presumed that the nitrogen having the fixed pressure (Pc=10 MPa) was constantly brought into contact with the molten resin, in the starvation zone 23 throughout 1 cycle of the injection molding including, for example, the plasticizing and weighing step, the injection step, the cooling step for the molded product, and the taking out step and that the molten resin was constantly brought into contact with the nitrogen having the fixed pressure in the starvation zone 23 during the continuous molding for 50 individuals of molded products.

In Example 2, the foam-molded product, which had a specific gravity lighter than that of the solid molded product by about 70% and in which warpage thereof was corrected, was successfully produced continuously and stably. According to this result, it was revealed that the amount of dissolution (amount of permeation) of the physical foaming agent with respect to the molten resin was stabilized. Further, the surface state of the obtained foam-molded product was observed. The swirl mark, in which the separated gas was transferred to the molded product surface to deteriorate the surface property, was formed only slightly. Further, the foam cells were observed for the cross section of the obtained foam-molded product. The average cell diameter of foam cells was 38 μm which was fine, and any breakage of foam was not observed.

From the above-described results of Example 2, it was revealed that in a case that the introduction pressure (Pc) of the physical foaming agent was not less than 6 MPa, preferably not less than 8 MPa which is relatively high, the pressure retention in the starvation zone 23 can be stably performed with a simple method, while hardly being affected by the change in the resin density in the pressure boosting part 25, and that the effect which is similar to that obtained in Example 1 can be achieved.

Example 3

In Example 3, a producing apparatus which has a configuration similar to that used in Example 1, except that the maximum value $DS_1$ of the diameter of the shaft of the screw 20 in the pressure boosting part 25 was 77 mm which was same as the maximum value (large diameter part 20A) $DS_2$ of the diameter of the shaft of the screw 20 in the compression zone 22 ($DS_1=DS_2=77$ mm) was used. Further, a foam-molded product was produced by using a material same as that used in Example 1 and with a method similar to that used in Example 1.

In Example 3, the measured value of the pressure sensor 27 was changed per cycle, as follows. Firstly, although the measured value was 4 MPa immediately before the start of plasticization and weighing of the molten resin, the measured value was raised up to 8.5 MPa at a timing at which the screw 20 started move backwardly (started retreating) immediately after the start of plasticization and weighing of the molten resin. Afterwards, the measured value was lowered immediately, and was maintained at 4 MPa again. Therefore, the absolute value of difference (range of pressure fluctuation: ΔP) between the maximum value (Pmax=8.5 MPa) of the pressure of the molten resin in the pressure boosting part 25 and the above-described fixed pressure (Pc=4 MPa) of the introduced physical foaming agent was 4.5 MPa.

The injection molding for the molded product was continuously performed for 100 shots to obtain 100 individuals (pieces) of foam-molded products. Further, the foam cells were observed for the cross section of the obtained foam-molded product. As a result, it was revealed that the average cell diameter of foam cells was 30 μm which was fine, and any breakage of foam was not observed. However, when the number of times of the continuous molding performed was increased and the injection molding for the molded product was continuously performed for 500 shots, the vent-up occurred.

Example 4

In Example 4, a producing apparatus which has a configuration similar to that used in Example 1, except that the length L of the pressure boosting part 25 in the extending direction of the screw 20 was 200 mm (L=2.5 DC) was used. Further, a foam-molded product was produced by using a material same as that used in Example 1 and with a method similar to that used in Example 1.

In Example 4, the measured value of the pressure sensor 27 was changed per cycle, as follows. Firstly, although the measured value was 4 MPa immediately before the start of plasticization and weighing of the molten resin, the measured value was raised up to 9 MPa at a timing at which the screw 20 started move backwardly (started retreating) immediately after the start of plasticization and weighing of the molten resin. Afterwards, the measured value was lowered immediately, and was maintained at 4 MPa again. Therefore, the absolute value of difference (range of pressure fluctuation: ΔP) between the maximum value (Pmax=9 MPa) of the pressure of the molten resin in the pressure boosting part 25 and the above-described fixed pressure (Pc=4 MPa) of the introduced physical foaming agent was 5 MPa.

The injection molding for the molded product was continuously performed for 100 shots to obtain 100 individuals (pieces) of foam-molded products. Further, the foam cells were observed for the cross section of the obtained foam-molded product. As a result, it was revealed that the average cell diameter of foam cells was 35 μm which was fine, and any breakage of foam was not observed. However, when the number of times of the continuous molding performed was increased and the injection molding for the molded product was continuously performed for 300 shots, the vent-up occurred.

Comparative Example 1

In Comparative Example 1, a producing apparatus which has a configuration similar to that used in Example 1, except that the screw did not have the pressure boosting part 25. Further, a foam-molded product was produced by using a material same as that used in Example 1 and with a method similar to that used in Example 1.

The injection molding for the molded product as explained above was continuously performed for 100 shots to obtain 100 individuals (pieces) of foam-molded products. During the production of the foam-molded products, the pressure of the starvation zone 23 in the plasticizing cylinder 210 was constantly measured by the pressure sensor 27. As a result, the pressure in the starvation zone 23 was 4 MPa all the time which was constant. No vent-up occurred. The foam cells were observed for the cross section of the obtained foam-molded product. As a result, although the average cell diameter of foam cells was 50 μm which was fine, the average cell diameter of foam cells was larger that in Example 1 (the average cell diameter of foam cells was 28 μm). Further, formed molded products with local breakage of foam were observed sporadically. From these results, it is presumed that the separation of the molten resin and the physical foaming agent occurred during the molding.

From the comparison between Examples 1 to 4 and Comparative Example 1, it was confirmed that by providing the pressure boosting part 25 in the inside of the starvation zone 23, the permeation of the physical foaming agent into the molten resin was promoted and that the separation of the physical foaming agent from the molten resin was suppressed. Each of Examples 1 to 4 and Comparative Example 1 used the plasticizing cylinder which was relative large and in which the screw diameter DC was 60 mm. With respect to the plasticizing cylinder of a large size, it is difficult to permeate any sufficient amount of the physical foaming agent into the molten resin, and there is also such a fear that the physical foaming agent might be separated from the molten resin. In each of Examples 1 to 4, it was possible to permeate the sufficient amount of the physical foaming agent into the molten resin and to suppress the separation of the physical foaming agent from the molten resin in such a large-sized plasticizing cylinder.

According to the method of the present teaching, it is possible to simplify the apparatus mechanism concerning the physical foaming agent. Further, the foam-molded product, which is excellent in the foaming performance, can be efficiently produced at the low cost.

What is claimed is:

1. A producing apparatus for producing a foam-molded product, comprising:
    a plasticizing cylinder provided with a plasticizing screw which is rotatable inside the plasticizing cylinder, wherein the plasticizing cylinder comprises: a plasticization zone in which a thermoplastic resin is plasticized and melted into a molten resin, a starvation zone in which the molten resin is allowed to be in a starved state, and a recompression zone in which the molten resin in the starved state is compressed to increase pressure of the molten resin, wherein the plasticization zone, the starvation zone, and the recompression zone are arranged in this order from an upstream side in a flowing direction of the resin, and wherein the plasticizing cylinder further comprises an introducing port via which a physical foaming agent is introduced into the starvation zone; and
    a physical foaming agent supplying mechanism configured to supply a pressurized fluid containing the physical foaming agent having a fixed pressure into the starvation zone of the plasticizing cylinder,
    wherein at least one pressure boosting part is provided in the starvation zone of the plastic cylinder.

2. The producing apparatus according to claim 1, wherein the pressure boosting part temporarily increases the resin density of the molten resin when the molten resin passes through the pressure boosting part.

3. The producing apparatus according to claim 1, wherein the pressure boosting part is formed of a part of the plasticizing screw, and a diameter of a shaft of the plasticizing screw in the pressure boosting part is greater than the diameter of the shaft in parts of the plasticizing screw located on the upstream and the downstream, respectively, of the pressure boosting part in the starvation zone.

4. The producing apparatus according to claim 1, wherein the pressure boosting part is formed of a part of the plasticizing screw; and
    in the starvation zone, a diameter of a shaft of the plasticizing screw is greater in the pressure boosting part than in a different part from the pressure boosting part.

5. The producing apparatus according to claim 4, wherein in the starvation zone, the diameter of the shaft of the plasticizing screw in the different part from the pressure boosting part is constant.

6. The producing apparatus according to claim 4, wherein the plasticizing cylinder further has a compression zone which is arranged on an upstream side of the starvation zone and in which the molten resin is compressed so as to increase pressure of the molten resin; and
    a maximum value of the diameter of the shaft of the plasticizing screw in the pressure boosting part is smaller than that of the plasticizing screw in the compression zone.

7. The producing apparatus according to claim 6, wherein the plasticizing cylinder satisfies the following expression (1):

$$0.5DS_2 < DS_1 < 0.95DS_2 \quad (1)$$

in the expression (1),
    $DS_1$: the maximum value of the diameter of the shaft of the plasticizing screw in the pressure boosting part, and
    $DS_2$: the maximum value of the diameter of the shaft of the plasticizing screw in the compression zone.

8. The producing apparatus according to claim 1, wherein the plasticizing cylinder satisfies the following expression (2):

$$0.5DC \leq L \leq 2DC \quad (2)$$

in the expression (2),
    L: length of the pressure boosting part in an extending direction of the plasticizing screw, and
    DC: inner diameter of the plasticizing cylinder.

9. The producing apparatus according to claim 1 further comprising an introducing speed adjusting container connected to the introducing port of the plasticizing cylinder,
    wherein a maximum value of inner diameter of the introducing speed adjusting container is greater than inner diameter of the introducing port; and
    the pressurized fluid having the fixed pressure is introduced from the physical foaming agent supplying mechanism into the starvation zone via the introducing speed adjusting container.

* * * * *